US009057796B2

(12) United States Patent
Nyffenegger et al.

(10) Patent No.: US 9,057,796 B2
(45) Date of Patent: Jun. 16, 2015

(54) SYSTEMS AND METHODS FOR ACQUIRING AND CHARACTERIZING TIME VARYING SIGNALS OF INTEREST

(75) Inventors: Paul Armin Nyffenegger, Rockledge, FL (US); Mark Andrew Tinker, Merritt Island, FL (US); Arthur Owen Endress, Melbourne, FL (US)

(73) Assignee: Quantum Technology Sciences, Inc., Cocoa Beach, FL (US)

( * ) Notice: Subject to any disclaimer, the term of this patent is extended or adjusted under 35 U.S.C. 154(b) by 574 days.

(21) Appl. No.: 13/423,589

(22) Filed: Mar. 19, 2012

(65) Prior Publication Data

US 2012/0174676 A1 Jul. 12, 2012

Related U.S. Application Data

(63) Continuation-in-part of application No. 13/496,335, filed as application No. PCT/US2010/049281 on Sep. 17, 2010.

(60) Provisional application No. 61/276,820, filed on Sep. 17, 2009.

(51) Int. Cl.
*G01V 1/16* (2006.01)
*G01V 1/18* (2006.01)

(52) U.S. Cl.
CPC .................................. *G01V 1/186* (2013.01)

(58) Field of Classification Search
CPC ........................................................ G01V 1/186
USPC ................... 367/157, 159, 165; 310/337, 348; 73/649
See application file for complete search history.

(56) References Cited

U.S. PATENT DOCUMENTS 4,794,295 A * 12/1988 Penneck et al. ............... 310/330
4,797,863 A *  1/1989 Gonzalez et al. ............. 367/157
4,809,244 A *  2/1989 Penneck et al. ............... 367/162

* cited by examiner

*Primary Examiner* — John Chapman, Jr.
(74) *Attorney, Agent, or Firm* — Ferdinand M. Romano; Beusse Wolter Sanks & Maire, P.A.

(57) ABSTRACT

A sensor system responsive to acoustic or seismic signals. One system includes a frame and a piezo-electric sensor element. The sensor element, responsive to a wavefield of seismic or acoustic energy, is positioned about the frame. Coupling between the sensor element and the frame is so limited as to render direct coupling of the sensor element with the wavefield the predominant means for stimulating the sensor element with seismic energy. Another system includes a frame and a cable element, responsive to a seismic or acoustic wavefield, extending about the frame. Coupling between the cable element and frame is so limited as to render direct coupling of the sensor element with the wavefield the predominant means for stimulating the sensor element with acoustic or seismic energy. The element may be coaxial cable or have piezo-electric properties to generate a charge differential measurable as a voltage between conductors.

20 Claims, 21 Drawing Sheets

SYSTEMS AND METHODS FOR ACQUIRING AND CHARACTERIZING TIME VARYING SIGNALS OF INTEREST

RELATED APPLICATIONS

This application is a continuation-in-part of US National Stage Application 13/496,335filed Mar. 15, 2012 and claims priority to PCT/US10/49281 filed Sep. 17, 2010 and U.S. Provisional Application U.S. 61/276,820 filed Sep. 17, 2009. This application is related to U.S. Ser. No. 13/423,607 filed Mar. 19, 2012.

STATEMENT REGARDING FEDERALLY SPONSORED RESEARCH AND DEVELOPMENT

The United States Government may have certain rights in this invention.

FIELD OF THE INVENTION

This invention relates to acquisition and characterization of data, including seismic information. More particularly, embodiments of the invention enable determination of signals of interest with reduced delay relative to the time of signal detection and with improved reliability.

BACKGROUND OF THE INVENTION

Signal monitoring continues to be a field of great importance in order to provide improved responsiveness in a variety of time critical contexts. For example, early warnings of events which may cause natural disasters can provide essential time for evacuation or emergency preparedness. It is also desirable to detect the presence of human, animal or equipment activity with a low error rate in order to counter threatening activities including military operations, border intrusions and trafficking of illegal goods.

In the past it has been commonplace to employ multimodal sensing schemes to characterize such activity in an automated or quasi-automated manner. For example, it is conventional to employ a combination of sensor systems to discriminate certain sources from others. In one implementation there may be acquisition of temperature, infrared data, magnetic sensing which, in combination, can be used to confirm the presence of a specific object such as a type of air craft or terrestrial vehicle. Such systems are complex and often not portable due to size and weight. They are not well-suited for rapid deployment and, generally, consume levels of power that make long term battery powered operation impractical. Such objects of interest have also been identified on the basis of data matching wherein the source, e.g., a moving motor vehicle, is known to have a generic signature. Acquisition of time varying power density and spectral data associated with specific sources of seismic or acoustic energy can be compared with a fingerprint template for a specific vehicle type to determine whether the vehicle is a motor cycle or a truck. Due to the varied nature of signatures within a category (e.g., moving trucks), such fingerprint matching techniques may have an unacceptably high rate of false detections or may result in error, i.e., a failure to identify a vehicle as being in a suspect class. There is a need to provide systems and methods which enable rapid detection of specific types of sources with high levels of confidence.

SUMMARY OF THE INVENTION

In accord with a first series of exemplary embodiments according to the invention, there is provided a sensor device or sensor system responsive to acoustic or seismic signals. In a first series of embodiments, a system includes a frame and a piezo-electric sensor element. The sensor element, responsive to a wavefield of seismic or acoustic energy, is positioned about the frame. Coupling between the sensor element and the frame is so limited as to render direct coupling of the sensor element with the wavefield the predominant means for stimulating the sensor element with seismic energy. The sensor element may be a multi-layer material comprising a polymer. The sensor element may be in the form of a coaxial cable or may comprise a material having piezo-electric properties positioned between the conductors to generate a charge differential measurable as a voltage between the conductors. The frame may be in the shape of a tubular body, e.g., a cylinder, and the element may be a cable comprising spaced-apart conductors wrapped around the frame in a spiral configuration to form a single row of the cable with the cable arranged in a non-overlapping configuration. The system may further include one or more additional sensing devices each having a frame and an element, generally responsive to the wavefield, positioned about the frame. A monitoring device may be coupled to receive information from each of the sensing devices.

In another series of embodiments, a system includes a frame and a cable element, responsive to a wavefield of seismic or acoustic energy, extending about the frame, wherein coupling between the cable element and the frame is so limited as to render direct coupling of the sensor element with the wavefield the predominant means for stimulating the sensor element with acoustic or seismic energy. The sensor element may be a multi-layer material comprising a polymer or may be in the form of a coaxial cable comprising a material having piezo-electric properties positioned between conductors to generate a charge differential measurable as a voltage between the conductors. The frame may be in the shape of a tubular body, e.g., a cylinder, and the element may be a cable comprising spaced-apart conductors wrapped around the frame in a spiral configuration to form a single row of the cable with the cable arranged in a non-overlapping configuration. The system may further include one or more additional sensing devices each comprising a frame and an element, responsive to the wavefield, positioned about the frame. A monitoring device may be coupled to receive information from each of the sensing devices. The system may be configured to generate classification information based on data acquired by one or more of the sensing devices.

BRIEF DESCRIPTION OF THE DRAWINGS

Features, aspects, and advantages of the present invention will become better understood when the following detailed description is read with reference to the accompanying drawings in which like characters represent like parts throughout, and wherein.

Like reference numbers are used throughout the figures to denote like components. Numerous components are illustrated schematically, it being understood that various details, connections and components of an apparent nature are not shown in order to emphasize features of the invention. Various features shown in the figures are not shown to scale in order to emphasize features of the invention.

DETAILED DESCRIPTION OF THE INVENTION

Before describing in detail particular embodiments of devices, systems and methods according to the invention, it is noted that the present invention resides primarily in a novel and non-obvious combination of components and process steps. So as not to obscure the disclosure with details that will be readily apparent to those skilled in the art, certain conventional components and steps have been omitted or presented with lesser detail, while the drawings and the specification describe in greater detail other elements and steps pertinent to a conceptual understanding of the invention. Further, the illustrated embodiments do not define limits as to the definition of any system or method according to the invention, but only provide examples which include features that are permissive rather than mandatory and illustrative rather than exhaustive.

Figure 1:
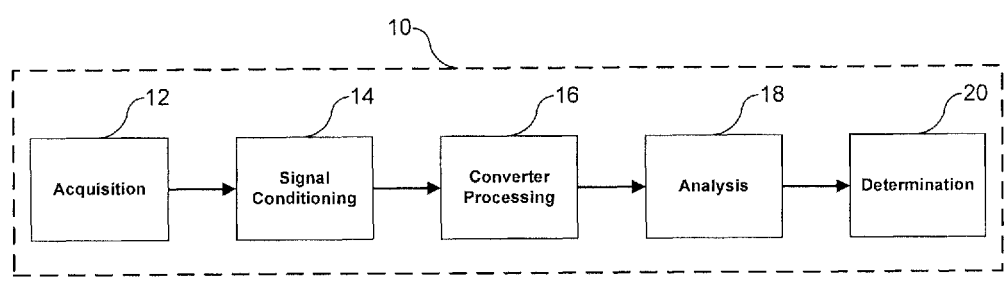
FIG. 1 illustrates, in simplified form, an exemplary process according to the invention for acquiring, detecting and classifying a signal of interest.

With reference to FIG. 1 there is illustrated, in simplified form, an exemplary process 10 for acquiring, detecting and classifying a signal of interest. The term "signal of interest" refers to a signal which is often of a relatively a low power level, close to or embedded below ambient noise levels. If the signal is detected as data of potential interest, it can subsequently be classified within a distinct group of objects for which the process is intended to identify members. Examples of such groups are footsteps, stationary generators, aircraft and various other types of vehicles. During Acquisition 12 a seismic signal is acquired with a sensor having a relatively flat response in a frequency range extending from 2 Hz or less and upward. In the illustrated embodiments the frequency range of the sampled signal (after digitizing) is above 400 Hz and can extend into the kiloHertz range. In the following examples the sensor is of the piezoelectric type, providing signal based on charge separation. The acquired signal undergoes signal conditioning 14 which may, for example, convert the charge separation to a voltage level, filter and amplify the signal, and provide level adjustments needed for further processing.

During Converter Processing 16 the conditioned signal is digitized to provide a digital stream in a form suitable for analysis. The data stream provided by Converter Processing 16 is received for Analysis 18 which applies a set of criteria to segments of the digitized data to determine whether the data contain signals of potential interest. A feature of the invention is that data frame size is specific to the process. For example, the length of data frames is customized for the initial detection of signals of potential interest as well as for each object classification, e.g., footsteps, or vehicles. Thus the digital stream initially generated during converter processing is later formatted into frames prior to processing in conjunction with specific algorithms. The frames of data may overlap with adjacent frames in a time series or may be entirely distinct from one another. For each processing function the defined frame contains a set number of data values captured during a defined period. For example, algorithms used to classify a motor vehicle may format the data into frames of 1024 or 2048 values acquired during a period ranging from 500 to 1,000 ms. By way of example, a frame may contain 2048 samples of data, each corresponding to a measured level in the serial stream of digitized data. When a determination is made that a frame of data contains a signal of potential interest, two separate assessments can be made as to whether the signal of potential interest meets criteria for classification as a Signal of Interest (SOI). A first assessment can be provided to a remote station while data for performing a second, more sophisticated assessment is still being acquired. Cycle times for generating first assessments are faster than cycle times for generating second assessments, but the first assessments can have higher false alarm rates than the second assessments because they are based on less data than the second assessments. Nonetheless, first assessments provide early warnings regarding likely existence of Signals of Interest (SOI's). The first and second assessments are each based on characteristic features derived from signals of potential interest, either over a single frame or over multiple frames of data. The characteristic features comprise sets of information useful for classifying the data of interest into one or more distinct groups of objects. The results of these assessments are used to make a Determination 20 which provides indications as to whether or not signals of potential interest meet threshold criteria for classification as particular types of Signals of Interest. Summarily, the Analysis 18 indicates whether the acquired data suggests one or more specific classifications and the Determination 20 indicates that one or more threshold criteria are met which establish a minimum confidence level that the assessment is correct. With imposition of predetermined criteria the Analysis 18 and Determination 20 result in: (a) a conclusion that a signal of potential interest is a SOI that is a member of a particular class of objects; or (b) a conclusion that the signal of potential interest is not a SOI. Each conclusion is accompanied by a confidence level.

The first assessment, being based on a limited set of data (e.g., one frame of 2048 values) and feature information derived from the data, provides a preliminary conclusion on classification. That is, an inference about SOI classification can be provided at a predetermined, minimally acceptable confidence level for the purpose of generating a short term Warning. The Warning is useful during the period in which other segments of data acquired by the sensor are being processed to generate the second assessment. With the cycle time of the second assessment spanning a time period in which multiple frames of data are collected and additional more sophisticated metrics are calculated, the second assessment provides determinations at a higher level of confidence than the determination generated by the first assessment. According to embodiments of the invention, a sequence of second assessments is generated as additional frames of data are incorporated into the analysis process with previously acquired data frames. The confidence level of the most recent assessments in the sequence can increase relative to earlier assessments in the series as more information is used in the later analyses. With such an arrangement and with the setting of a threshold level of confidence, an alert, indicating the conclusion about classification, can be generated based on the second assessment as soon as the confidence level reaches the threshold level. However, for a given classification, the number of frames of data required to reach the threshold level of confidence may vary based on, among other factors, signal strength and signal type.

Figure 2:
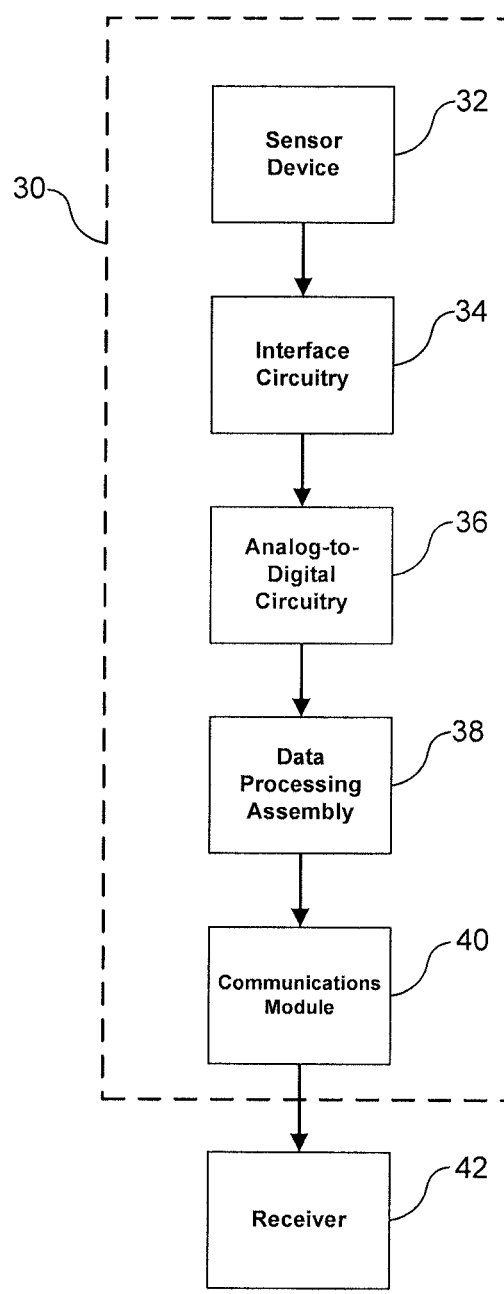
FIG. 2 is a block diagram illustrating general features of an exemplary sensor system according to the invention with which the process of FIG. 1 can be performed.

FIG. 2 illustrates an exemplary sensor system 30 with which the process 10 for acquiring, detecting and classifying a signal of interest may be performed.

A sensor device 32 acquires seismic and acoustic data which is sent to interface circuitry 34 for conditioning. The analog signal is then received by analog-to-digital (A/D) circuitry 36 which converts the signal into formatted frames of digital data. Data processing assembly 38 receives the digitized data to perform analyses 18 and determinations 20 as described with respect to FIG. 1. For both first assessments and second assessments the assembly 38 outputs determinations 20 as to whether the acquired data constitute a SOI. Each determination is based on (1) criteria corresponding to one or more specific classifications and (2) a requirement that the level of confidence of the associated assessment that a valid conclusion has been drawn exceeds a threshold level. A communications module 40 is configurable to receive and transmit the determinations 20 via a designated mode to a receiver 42 such as a handheld device or a base station located at a position remote from the sensor 32. The communications link between the communications module 40 and the receiver 42 may be via an Ethernet connection, a radio link or other suitable mode.

Figure 3A:
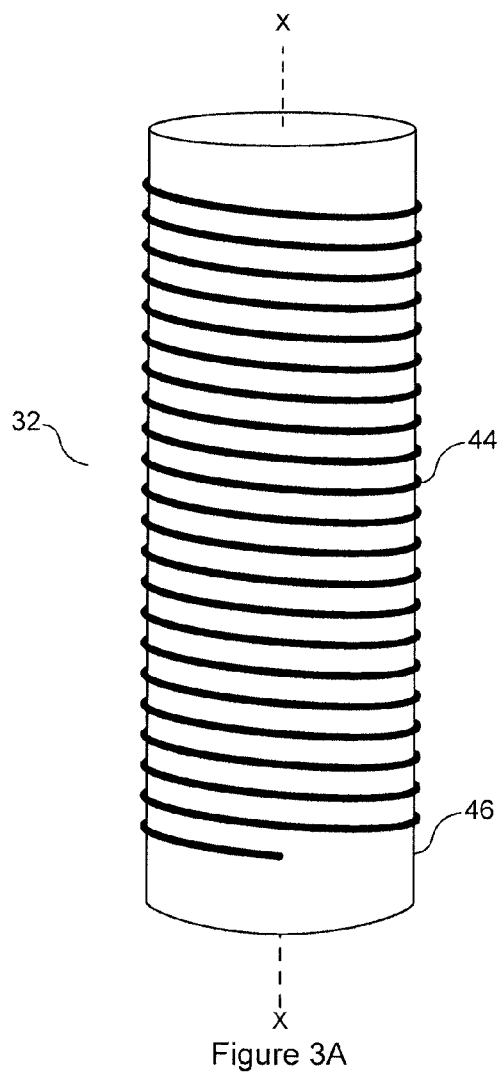
FIG. 3A illustrates a sensor device 32 according to an embodiment of the invention.

FIG. 3A is a simplified illustration of the sensor device 32 according to an embodiment suitable for incorporation into the system 30. The sensor device 32 comprises at least one signal sensing element 44 positioned about a support structure 46. In this example, the support structure 46 is, generally, a tubular body having a chamber therein. The exemplary body shape is cylindrical although a variety of symmetric and asymmetric shapes are suitable. The sensing element 44 is of the piezo-electric class but it is to be understood that numerous features according to the invention can be practiced with other sensing elements including, in some instances, with conventional sensors such as geosensors of the type comprising an inertial mass whose displacement in a magnetic field generates a voltage signal. According to embodiments of the invention the piezo-electric sensing element 44 is in the form of a cable generally known as a piezo polymer coaxial cable. Such cable sensors comprise a dielectric material having piezo-electric properties positioned between an inner (center) conductive core and an outer layer of conductor which may be a foil or which may comprise strands of wire braided together. An insulative layer is formed over the outer conductor providing an exterior coating. In principle, when the cable is deformed, e.g., due to a strain or compression, a charge separation occurs in proportion to the level of strain or compression. Circuitry coupled to the two conductors, i.e., the inner core and the outer conductive layer, detects the charge separation as a voltage.

Piezo polymer coaxial cable has been available in multiple designs for a variety of uses such as weigh-in-motion applications. The inner (center) conductive core may comprise wire strands and the outer layer may be braided conductor, e.g., copper. The dielectric material having piezo-electric properties may be a polymer which is drawn or extruded over the conductive core, or the dielectric material may be in the form of a tape wrapped about the core in a spiral arrangement. Products of both designs have been offered by Measurement Specialties, Inc. of Hampton Va., USA and MEAS Deutschland GmbH located in Dortmund, Germany. Other cable designs are suitable for use as the sensing element 44 in the sensor device 32.

Figure 4A:
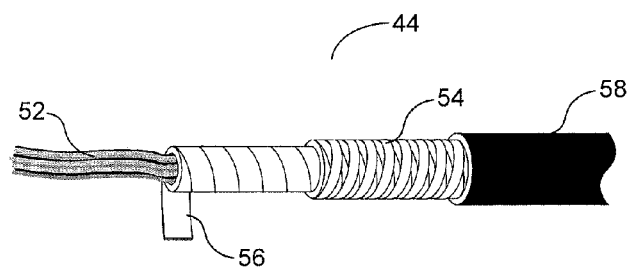
FIG. 4A is a cut-away view of a section of piezo polymer coaxial cable taken along the cable axis.

FIG. 4 illustrates a segment of such piezo polymer coaxial cable, for use as the sensing element 44, comprising an inner core conductor 52, a layer 56 of piezo polymer material formed about the conductor 52 and an outer conductor 54 surrounding the layer 56 of piezo polymer material. A protective insulative layer 58 is formed over the outer conductor. Conventionally, piezo polymer coaxial cables have been primarily used in two classes of applications which each differ from embodiments of the invention having the sensor coupled directly to seismic-acoustic wave fields in order to detect seismic-acoustic signals. In embodiments of the invention direct coupling between the sensing element 44 and the wave field is the predominant path of sensing seismic-acoustic signals while other paths are limited or absent.

Piezoelectric materials are commonly anisotropic, meaning that electrical output of a material depends upon the direction of the mechanical strain vector with respect to the orientation of the material. As a result, physical constants describing the proportionality of the electrical output to the applied strain relate to both the direction of the applied mechanical strain and the directions orthogonal to the applied strain. This is generally denoted with two subscripts indicating direction of the two related quantities, such as stress and strain for elasticity, the two phenomena being related through Hooke's Law. The direction of positive polarization usually is made to coincide with the Z-axis of a Cartesian tri-axial system, which is generally the thickness direction and perpendicular to the horizontal extent for a sheet material. The Cartesian coordinate system directions of X, Y, and Z are usually represented by the subscripts 1, 2, and 3 respectively, as shown in FIG. 4C and those directions may be intimately related to the underlying orientation of molecules within the material depending upon the manufacturing process. In sheets or tapes of piezo polymers such as polyvinylidene flouride (PVDF) manufactured to a uniaxial standard, the X or 1 direction is tightly controlled and is usually taken as the long axis of a sheet or tape as is shown in FIG. 4C, and the axis of the PVDF molecule is oriented along the 1 direction with polarization in the 3 direction.

Figure 4B:
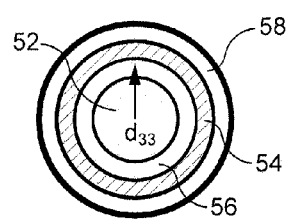
FIG. 4B is a view in cross section taken through the axis of the cable shown in FIG. 4A.
Figure 4C:
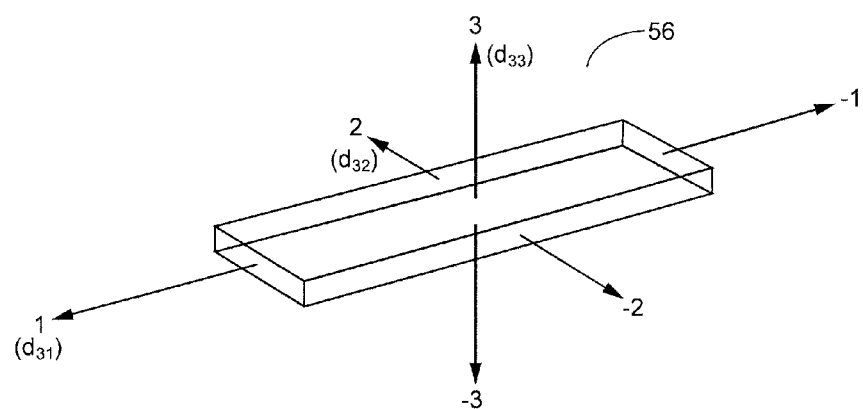
FIG. 4C is a perspective view of a segment of piezo polymer tape of the type incorporated in the cable shown in FIGS. 4A and 4B.

However, there are also PVDF sheets manufactured in a bi-axial configuration, where the orientation of the PVDF molecule in relation to the 1 and 2 direction are not tightly controlled and the molecules have a more random azimuthal orientation within the plane of the film, the result being that only the 3 direction shown in FIG. 4C (the direction of positive polarization) is tightly controlled, also corresponding to the radial direction in FIG. 4B.

The magnitude of strain induced in a piezoelectric material for an applied electric field is the product of the value of the electric field and a constant of proportionality called the piezoelectric charge constant, d. The piezoelectric charge constant, d, is defined for a unit volume as the mechanical strain experienced per unit of electric field applied, or alternately, the charge generated per unit of experienced mechanical stress. Of the two subscripts, the first is usually indicates the direction of applied field strength, or is the polarization created in the piezoelectric material when the electric field is zero. The second subscript is then the direction of the induced strain, or is the direction of the applied stress, respectively. Further description can be found in *Piezo Film Sensors Technical Manual* P/N 1005663-1 REV E 25 Mar. 2008 available from Measurements Specialties Inc., Hampton, Va.

The coefficient $d_{33}$ is then the induced strain in direction 3 per unit electric field applied in direction 3, or equivalently the induced polarization in direction 3 (parallel to the direction of polarization) per unit stress applied in direction 3. This is radial to the axis of the cable shown in the axial view of FIG. 4A, and along the 3 direction as shown in FIG. 4b. The coefficient $d_{31}$ is then the induced strain in direction 1 (perpendicular to the direction of polarization) per unit electric field applied in direction 3 or, equivalently, the induced polarization in direction 3 per unit stress applied in direction 1. For a uni-axial film the $d_{31}$ coefficient is generally large, but smaller than the $d_{33}$ coefficient and of opposite sign. For bi-axial films the $d_{31}$ coefficient is small and on the order of the $d_{32}$ coefficient, and of opposite sign to the $d_{33}$ coefficient.

The coefficient $d_{32}$ is defined in a manner similar to that of the $d_{31}$ coefficient except that the induced strain is in the 2 direction, in the same plane as the 1 direction, but perpendicular to both the 1 and 3 directions, or, equivalently, the induced polarization in the 3 direction per unit stress applied in the 2 direction, within the same plane as the 1 direction. For a uni-axial film the $d_{32}$ coefficient has a much smaller magnitude than $d_{31}$ and of opposite sign to $d_{33}$.

The combination of the coefficients $d_{31}+d_{32}+d_{33}$ is known as the hydrostatic response coefficient and is known as $d_{3h}$. Because in general $d_{31}$ and $d_{33}$ are of opposite sign, and $d_{33}$ is the larger coefficient, $d_{3h}$ is smaller in magnitude than $d_{33}$. In the case of a biaxial film, where the film is poled in the thickness or 3 direction but no preferred direction for the 1 or 2 axis is enforced on the molecular scale, then the $d_{31}$ and $d_{32}$ coefficients are reduced in magnitude and hydrostatic response is the preferred mode of usage. Additional information regarding equations of state and properties of PVDF can be found in "Measurements and Properties of Ferroelectric Polymers" by Furukawa, T. and T. T. Wang in *The Applications of Ferroelectric Polymers*, Wang, T. T., J. M. Herbert, and A. M Glass, eds. Chapman and Hall, New York. 1988.

The piezoelectric cable shown in FIG. 4 is constructed using a PVDF tape manufactured to have a bi-axial response geometry. The response of the piezoelectric-cable manufactured using this tape then will be maximized for hydrostatic response mode, corresponding to measuring fluctuations in the isotropic strain.

In the past, piezo polymer coaxial cables have been used for a class of detection involving sensing of compressive forces. In these applications the cable measures finite quasi-static strain. Examples are weigh-in-motion systems and perimeter monitoring. With the cable buried under a roadway or other ground mass, a signal is generated in the cable when a force is transmitted from above and through the ground medium to the cable. When the cable experiences the force, e.g., a compressive force, a transient charge displacement is generated in response thereto. In the weigh-in-motion example, the force resulting from the weight of a vehicle passing over the cable causes a physical compression of the cable proportional to the weight of the vehicle. In the context of perimeter monitoring, movement of a person, e.g., footsteps, or movement of a vehicle, along or over the cable also results in a transient compressive force which extends into the ground layer and to the cable such that both the ground layer and the cable experience compression which generates a transient charge separation.

A second class of detection involves sensing hydro-acoustic wave fields where piezo polymer coaxial cable senses acoustic signals which propagate large distances through water. See U.S. Pat. Nos. 4,794,295 and 4,809,244 each of which is incorporated herein by reference. In such systems a piezo-electric cable is mechanically coupled to a transducer in the form of a cylindrically shaped mandrel. The mandrel is a semi-flexible structure which supports a primary mode of vibration in radial directions about the major axis of the cylindrical shape. The structure can be formed from a polymer such as polyvinyl chloride or other materials. The cylinder shape has been proposed for use in hydro-acoustic applications, i.e., hydrophones, because it has characteristics suitable for transmitting the water-borne acoustic signals to the cable via the $d_{31}$ mode. The received signal propagates from the cylindrical body into the piezo-electric cable. With the cable tightly secured to the transducer to effect strong mechanical coupling, the received signal can propagate from the cylindrical body into the piezo-electric cable. To assure efficient coupling of acoustic vibration between the cylindrical body and the cable, in hydro-acoustic applications the cable is bound to the cylindrical body. In one design the cable is tightly wound against an exterior surface of the cylindrical body. In other designs the cable may be pressed against the cylindrical body with an overlaying layer of shrink-wrap plastic material. A result of the mechanical designs used in hydro-acoustic applications, is that the $d_{31}$ response of the cable is enhanced and the hydrostatic response of the cable, i.e., the $d_{3h}$ response, is suppressed via suppression of the $d_{33}$ response which corresponds to the radial response within the cable. See FIG. 4.

Figure 3B:
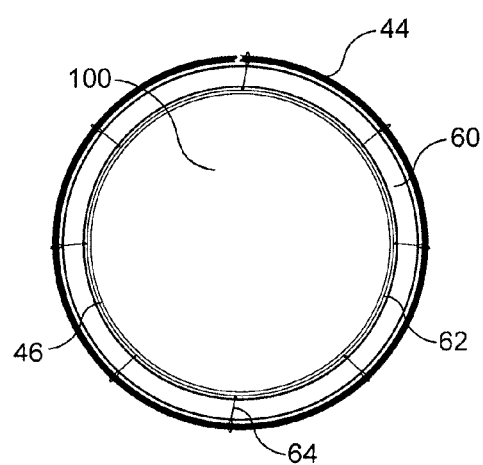
FIG. 3B illustrates in cross section a view of a sensor device according to another embodiment.

Design of the sensor device 32 results from recognition that, instead of receiving signal from a transducer element distinct from the piezo-electric sensing element 44, the element 44 couples directly with the seismic wave field. To effect this arrangement, instead of requiring that the cable be mechanically coupled to a rigid transducer element, such as a cylindrically shaped wall, the sensor element is the transducer and, at most, the sensor element is only secured to establish stable positioning of the element along the frame 464 in accord with a chosen configuration of the cable, e.g., a spiral geometry as shown in FIG. 3A. It is recognized that in many field applications of the sensor device, e.g., underground positioning, the environmental conditions may demand a rugged and durable attachment of the element 44 to the frame 46 in a manner which incidentally results in some mechanical coupling between the element 44 and the frame 46. By minimizing mechanical coupling of the cable with the frame, the predominant means for stimulating the cable with seismic energy is through direct coupling of the cable with the seismic-acoustic wavefield. Ideally, the mechanical coupling may be minimized or eliminated by eliminating direct contact of the sensor element 44 with the frame 46. This can be effected by imposing an intermediate layer between the element and the frame where the intermediate layer has relatively low stiffness and relatively poor transmission properties in the frequency range of interest. As one example, the intermediate layer may be an open cell foam material. Further, to assure stability of cable positioning, the cable can be tethered to the frame with filament under minimal tension. See FIG. 3B which illustrates a version of the sensor 32 having a frame 46 of cylindrical shape with the sensing element 44 wrapped thereabout in a spiral configuration. FIG. 3B is a view in cross section taken through the central axis of the frame and along one turn of the spiral cable configuration. An intermediate layer 60 is interposed between an exterior surface 62 of the frame 46 and the sensing element 44. A series of filaments 64 are secured along the surface 62 and extend through the intermediate layer 60 to the cable sensing element 44. The filaments are secured to the sensing element in discrete places, e.g., by loosely tying the filaments around the cable or by bonding the filaments to the exterior layer of the cable.

With the sensing element 44 functioning as the transducer, there is no requirement for a transducing structure that initially receives the signal for subsequent transmission to a sensing element. In the disclosed embodiments, the role of the frame 46 can be limited to providing minimal support and the frame need not provide a significant path for propagation of the seismic energy to the sensing element 44. Instead, the predominant path, and preferably the only path, of the seismic energy into the sensor device is directly from the seismic wavefront into the sensing element 44. According to embodiments of the sensor device 32 incorporating a frame, the function of the frame is to provide necessary support to position the cable sensing element 44 in a stable configuration for field deployment. Suitable designs do not impose significant constraints on responsiveness of the cable to the wavefield in any of the vibration modes, $d_{31}$, $d_{32}$, and $d_{33}$. Embodiments which result in the hydrostatic mode, $d_{3h}$, appear to provide greater sensitivity and frequency responsiveness relative to designs where the $d_{31}$ mode is predominant.

In summary, the sensor device 32 is a strain sensor providing an output signal in proportion to the strain experienced. The piezo-active element, e.g., the layer 56 of the piezo polymer coaxial cable, creates a separation of charge when the strain is experienced. That separation of charge is transformed into a suitable voltage via the interface circuitry 34 for further processing by the system 30. The sensing element 44 couples directly to the seismic-acoustic wave field. Accordingly, the element 44 is associated with minimal interfering or stiffening structures in order that the strain experienced by the piezo polymer on the molecular level provides a relatively large signal response in the form of measurable charge separation. With the piezo polymer coaxial cable acting in the hydrostatic mode, i.e., $d_{3h}$, it is important for the cable to be constrained as little as possible in order for the cable to deform with impinging seismic energy. Thus bonding the cable or tightly wrapping the cable to a mandrel would be detrimental to sensitivity of the cable response in the $d_{3h}$ mode. The purpose of the frame 46 is not that of providing a barrier or constraint to a particular mode (e.g., $d_{32}$) or to enhance another mode, e.g., $d_{33}$, but rather to provide integrity to the sensing element 44 and electronic components which may be integrated within the sensing device 32.

Further, the sensing element is designed as a point receiver having a substantially omni-directional response. The element 44 is designed as a point sensor to avoid cancellation effects among components of signal acquired over the length of the cable. The sensor element behaves as a point sensor relative to the wavelength of the seismic waves being sensed. This is to be contrasted with use of piezo polymer coaxial cable for perimeter monitoring, i.e., intrusion detection, where the cable is extended along a large distance (e.g., 10 to 100 meters) such that activity along the length of the cable results in signal which cannot be associated with a specific position along the cable. With a strain transferred to a portion of the cable (e.g., in response to the weight of a footstep), portions of the cable not under compression act as a passive capacitance over which the charge is distributed. Impingement of a seismic wave along a cable extending such a distance results in compressive strains on some portions of the cable and dilatational strains on other sections of the cable. When this occurs charge separations of opposite sign are generated in the same conductor which results in cancelations which give rise to no signal or reduced net signal. The sensor element 44 behaves as a point sensor when it extends over a limited distance consistent with the wavelength being sensed. Consequently, when a seismic wave impinges on the element 44 charge separation of the same sign is generated in all sections of the cable such that the signal components generated in different sections of the cable are additive.

A single sensor element 44 can be used to capture strains in all directions and the sensor device 32 can be placed in field locations for data acquisition without regard to its orientation, or changes in sensitivity and fidelity. Further, in the context of signal acquisition from seismic-acoustic wave fields, the sensing element has a substantially flat frequency response ranging at least from 1 Hz to above one KHz. The observable frequency response may, however, be limited by characteristics of other components in the system 30, such as the interface circuitry 34 and sampling frequencies of the analog-to-digital circuitry 36.

Figure 5A:
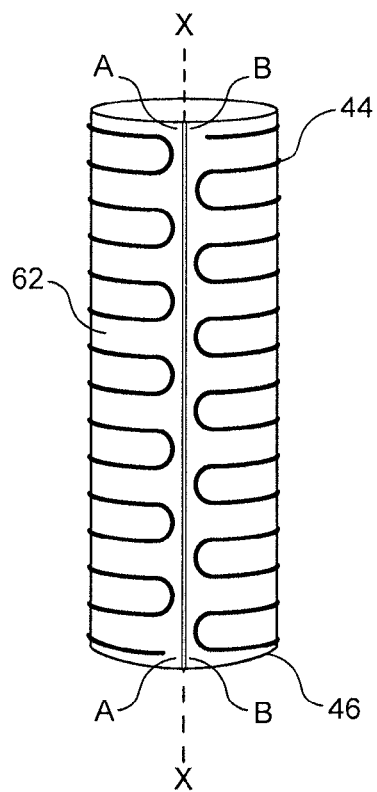
FIG. 5A is a perspective view of an alternate design of a sensor device.
Figure 5B:
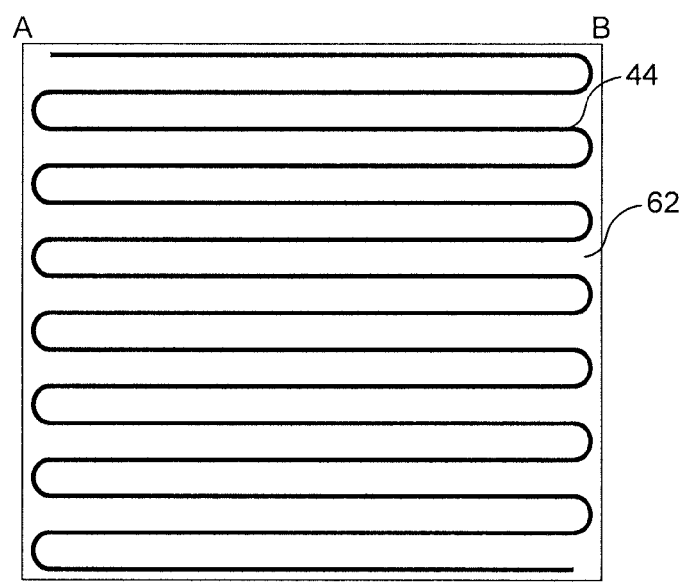
FIG. 5B is an unrolled view of a sensor element incorporated in the device of FIG. 5A.

FIG. 5 illustrate an alternate design of the sensor device 32. As shown in FIG. 5A, the frame 46 has a cylindrical shape extending along a central axis X. The sensing element 44 in the form of piezo polymer coaxial cable is wrapped about the surface 62 of the frame 46 in a serpentine design. This configuration is further illustrated in the unrolled view of FIG. 5B wherein the surface 62 is transformed into a plane for viewing as a sheet extending from reference line A-A to reference line B-B shown in FIG. 5A. The serpentine design may be modified to include two or more separate segments of piezo polymer coaxial cable each mounted on the surface 62 for support. By way of example, each segment of cable may cover a 180 degree segment of the surface 62. In another example, the separate segments of cable may be interwoven so that each pattern extends substantially around the entire frame 46 as shown for one sensing element 44 in FIG. 5A.

Figure 6A:
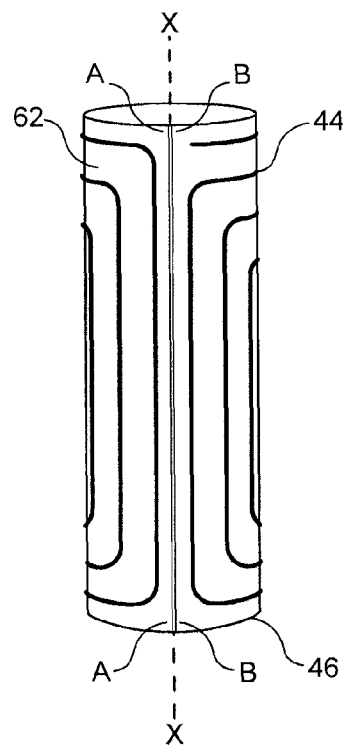
FIG. 6A is a perspective view of another alternate design of a sensor device.
Figure 6B:
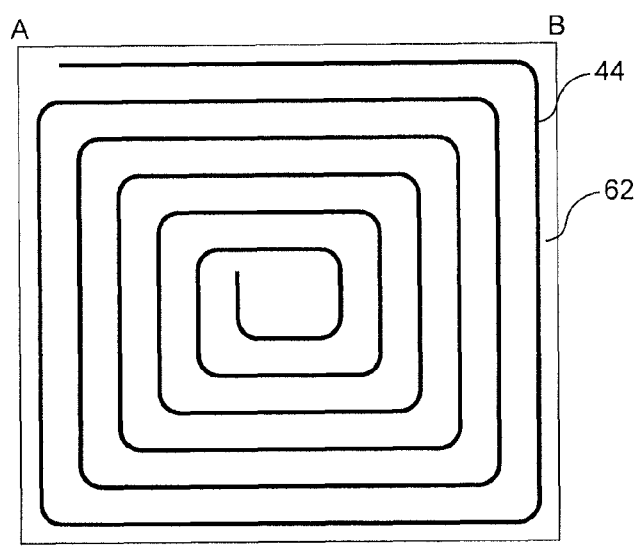
FIG. 6B is an unrolled view of a sensor element incorporated in the device of FIG. 6A.

FIG. 6 illustrate an alternate design of the sensor device 32. As shown in FIG. 6a, the frame 46 has a cylindrical shape extending along a central axis X. The sensing element 44 in the form of piezo polymer coaxial cable is wrapped about the surface 62 of the frame 46 in a spiral design. This configuration is further illustrated in the unrolled view of FIG. 6B wherein the surface 62 is transformed into a plane for viewing as a sheet extending from line reference A-A to reference line B-B shown in FIG. 6A. The spiral design may be modified to include two or more separate segments of piezo polymer coaxial cable each mounted on the surface 62 for support. The cable segments may be configured as a double helix, e.g., interwoven, arrangement. By way of further example, each segment of cable may cover a 180 degree segment of the surface 62.

Figure 7:
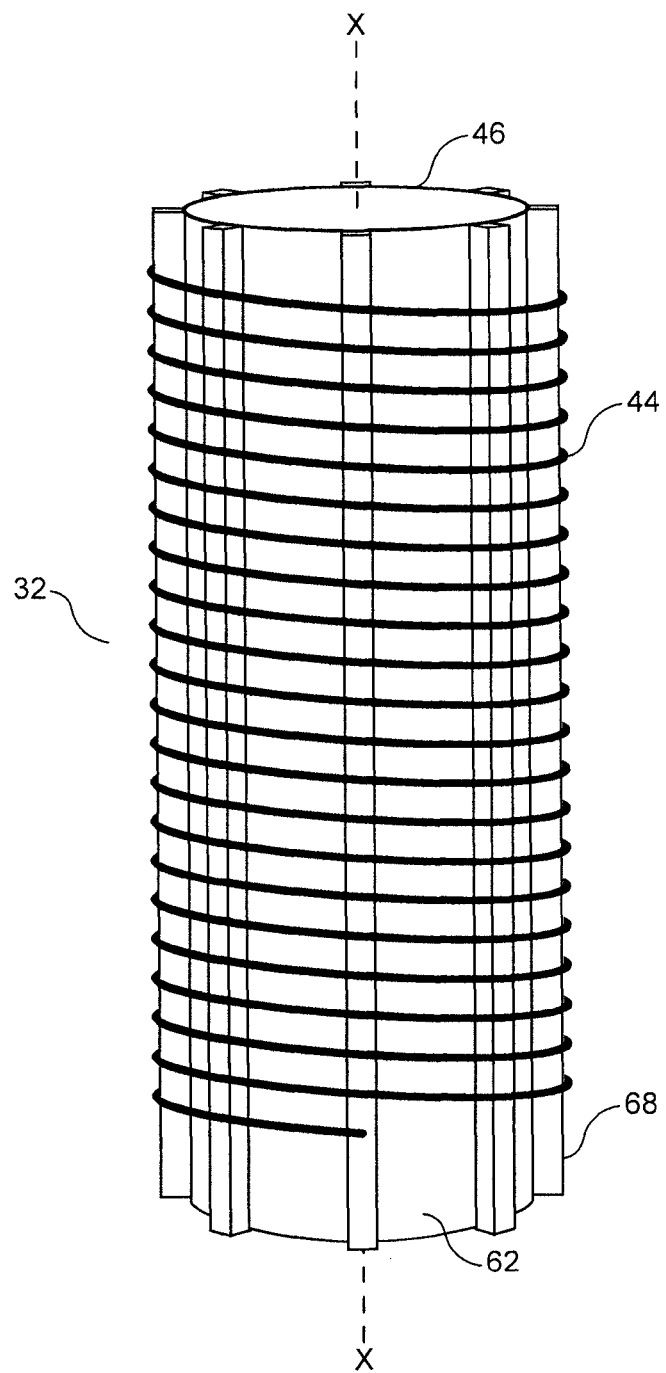
FIGS. 7-10 are perspective views of still other alternate designs of sensor devices.

The sensing element 44 may also be formed about a cylindrical frame 46 having a series of stand-offs circumferentially positioned about the surface 62 of the frame. See FIG. 7 which illustrates such an arrangement for a sensor device 32 where a series of stand-offs 68 extend along the surface 62 in directions parallel to the central axis X of the frame 46. With the sensing element in the form of one or more segments of piezo polymer coaxial cable, the stand-offs decouple the cable from the frame 46. The standoffs may comprise polyethylenes, elastomers, closed or open cell elastomers or foams or similar elements which facilitate decoupling of the cable from adjoining materials so that the cable is relatively free to respond to stimulations in all modes. The cable may be bonded at discrete points to two or three stand-offs per revolution of the spiral configuration about the frame 46.

Figure 8:
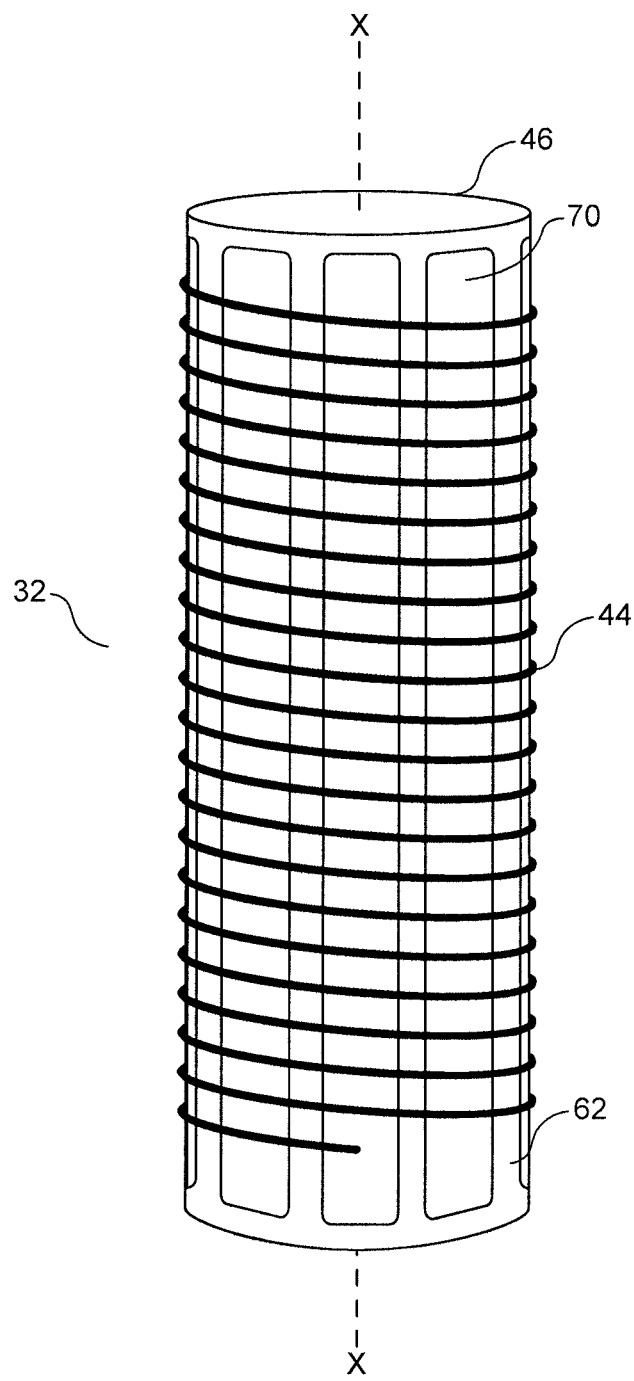

FIG. 8 illustrates another alternate design for a sensor element 32 with the sensor device 44 configured about a cylindrical frame 46 having a series of fluted openings 70 circumferentially positioned about the surface 62 of the frame. The openings 70 extend along the surface 62 in directions parallel to the central axis X of the frame 46. With the sensing elements 44 in the form of one or more segments of piezo polymer coaxial cable, the openings 70 decouple the cable from the frame 46. The cable may be bonded at two or three discrete points along the surface 62 per revolution of the spiral configuration about the frame 46.

Figure 9:
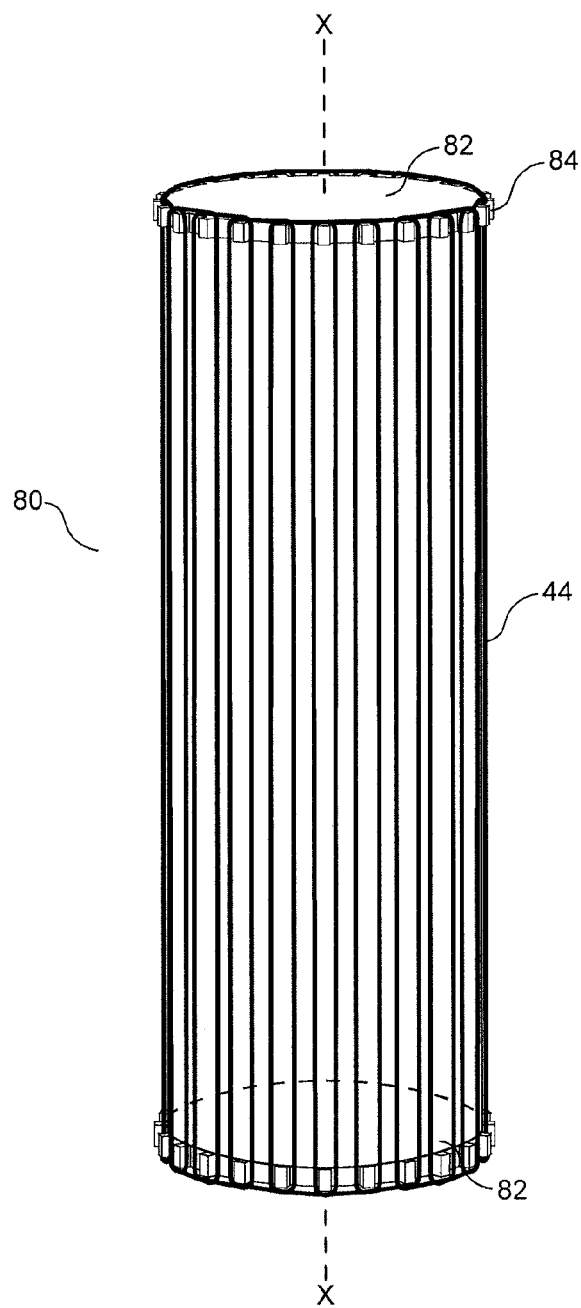

Next referring to FIG. 9, the sensing element 44 of the device 32 may also be formed about a frame 80 formed with two spaced-apart plates 82 each having a sprocket configuration wherein a series of teeth 84, serving as supports, are formed along the periphery thereof. The plates can be structurally connected with studs, bolts or other fasteners (not shown) which connect one plate to the other. With the sensing element in the form of one or more lengths of piezo polymer coaxial cable, the cable is wound about the structure by sequentially routing the cable between teeth on different plates while also sequentially progressing from one tooth to the next tooth on each plate. Other winding patterns are also contemplated. Generally, the cable is looped over the tooth supports and fixed at the teeth. The loops may overlap one another. With such arrangements each cable is decoupled from the frame over most of the cable length.

Figure 10:
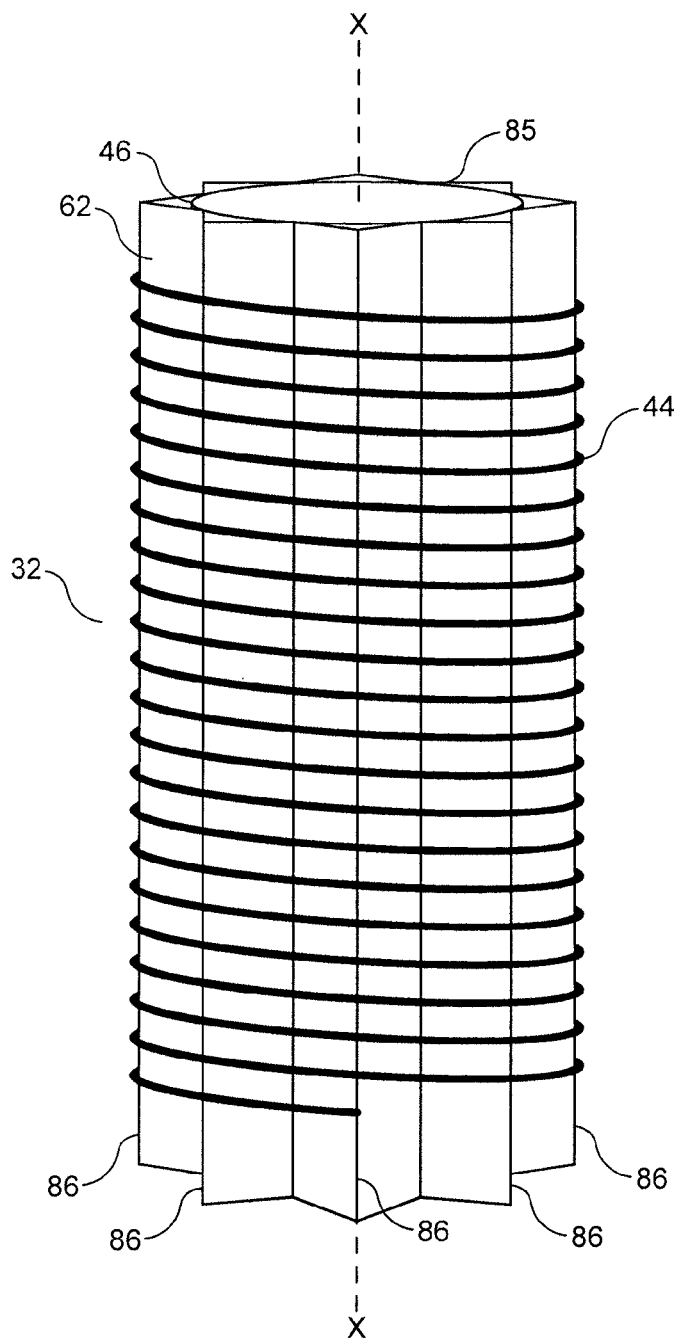

FIG. 10 illustrates the sensing element 44 of the device 32 formed about a two component frame 85 having a cylindrically shaped corrugated surface 62' formed over a frame 46' having the shape of a regular cylinder as shown for the frame 46 in FIG. 3A. In other designs the frame may be formed of a single cylindrically shaped component having the corrugated surface 62' integrally formed therewith. The corrugations extend in directions parallel to the central axis X of the frame 85 such that lines 86, corresponding to peaks of the corrugations, extending outward along the surface 62', are oriented in directions parallel to the central axis X. With the sensing element 44 in the form of one or more lengths of piezo polymer coaxial cable, the cable is wound across the peak lines 86 such that the cable only makes contact along the lines 86, i.e., at discrete points along the surface 62'. Other arrangements employing corrugations are contemplated. For example, the corrugations can be directions other than directions parallel with the axis X. The corrugations serve to decouple the piezo polymer coaxial cable from the frame.

Having described numerous exemplary embodiments of the sensor device 32 it should also be understood that the frame, being cylindrical in shape is not limited to such a geometry. More generally the frame 46 may be a tube in any of a variety of shapes including multi-sided solids and structures having conical or elliptical shapes in cross section. The sensor system 32 detects and classifies SOI's. The system is a sealed unit which can be buried at an arbitrary depth beneath the surface of the ground but numerous other placements may be had, including deployment on a ground surface, above the ground, over water, in water or in water-saturated earth.

The sensor device 32 passively monitors the seismic-acoustic energy at its location. When a signal of potential interest is observed, the sensor system 30 automatically processes and analyzes the signal. If the sensor determines with confidence that the source of the signal is a designated target activity, it communicates the Determination 20 regarding classification of the SOI to a remote receiver 42. For embodiments where the receiver is a base station, the received information is converted into one or a plurality of user notifications. These could include a simple audio or visual alert, the cueing of a camera, an unmanned aerial vehicle or other imaging or sensor system, the activation of a geophysical information system display showing location (known as putting "dots on a map"), or any other action required by a user.

Figure 11A:
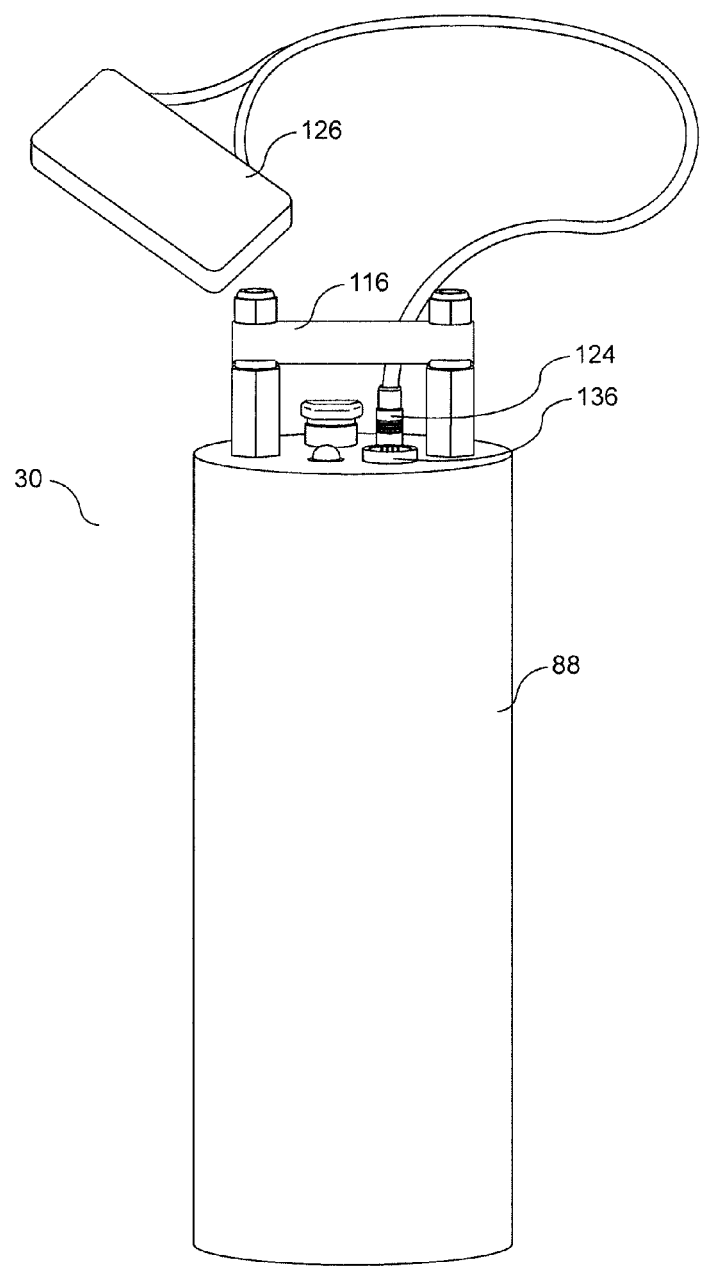
FIGS. 11A and 11B are partial perspective views of an embodiment of a sensor system according to the invention.
Figure 11B:
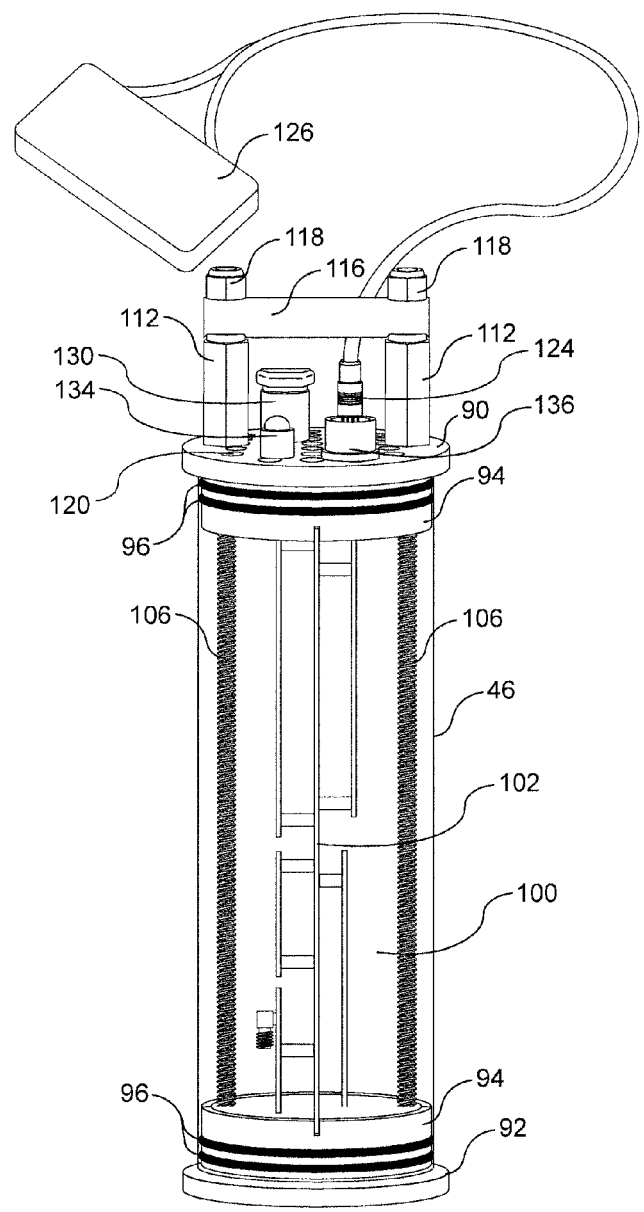
Figure 11C:
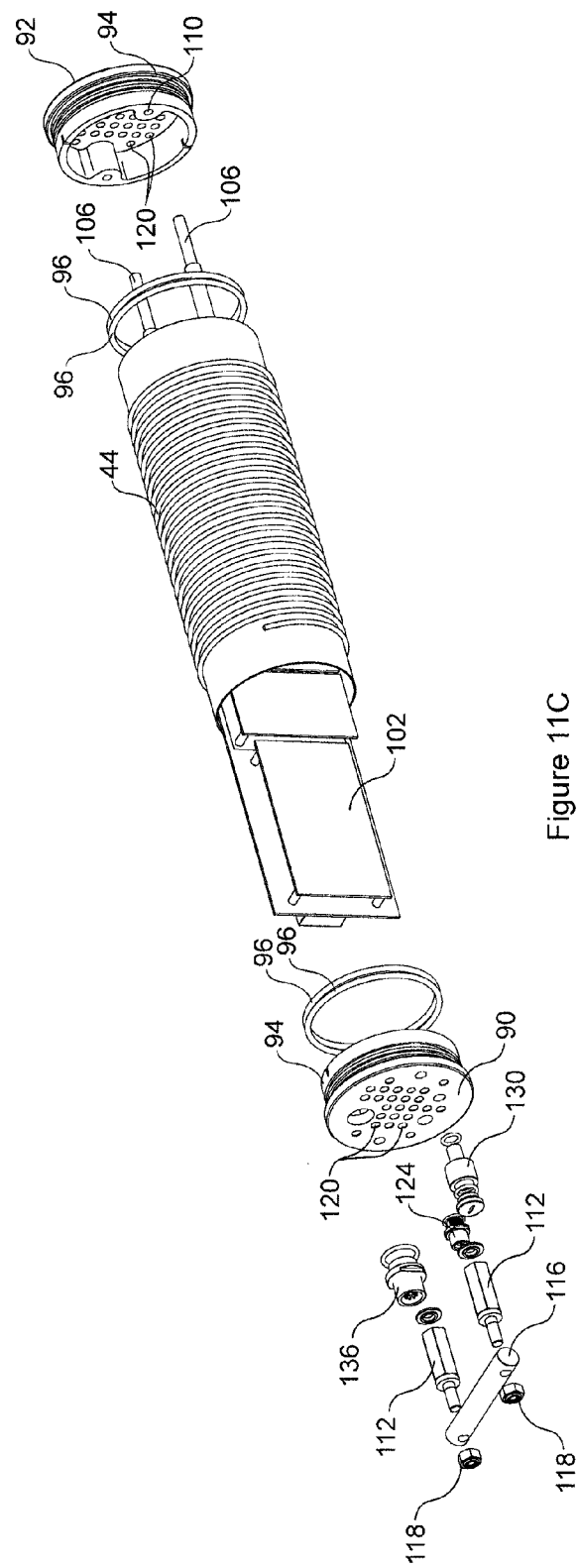
FIG. 11C is an exploded view of the sensor system shown in FIGS. 11A and 11B illustrating select components thereof.

FIGS. 11A-11C are a series of partial views of an embodiment of the sensor system 30 and select components. The sensor system 30 is in the shape of a cylinder in accord with the sensor device 32 of FIG. 3A. The tubular shape of the sensor device enables integration of the electronics needed to perform signal processing, including Analyses 18 which lead to classifications and issuance of Determinations 20, all within the frame 46 of the sensor device 32. However, it is to be understood that the packaging of such a system with associated electronics is not limited to any particular shape or configuration or requirement that the electronics be positioned within the sensor device. A feature of the system 30 is the ability to perform all requisite analyses at the location of placement so that data transmitted to the remote receiver can be limited to the Determinations 20.

To accomplish this functionality, the integrated electronics provides the hardware platform on which the signal acquisition, processing, and communications occurs. Embedded software operates within the electronics platform and provides signal processing, communications support, and intercommunication within the internal assemblies. The above-described mechanical housing provides structural support for the internal assemblies, protection from the deployment environment, and a mounting point for the sensing device 44.

To serve as an effective point receiver over the frequency range of interest, the frame 46 about which the sensing device 44 is wrapped is approximately 3 inches (7.6 cm) in diameter and 12 inches (30.5 cm) tall. External fittings on the sensor include connection elements for power and communications (wired or wireless), a pull handle, a purge valve, a power-on indicator, and a tether connector.

FIG. 11A provides an external view of the sensor system 30. An opaque hermetic sealant 88, such as a durable silicone rubber, is applied over the sensing device. In addition to rendering the system highly resistant to water intrusion, the sealant may be designed to assist in stabilizing the spiral configuration of the piezo polymer coaxial cable which forms the sensing device 44. FIG. 11B provides a view of the sensor system with both the sealant 88 and the piezo polymer coaxial cable removed, exposing the frame, which is shown as a transparent member formed of, for example, polyethylene Terephthalate Glycol having a wall thickness of 0.32 inch (0.8128 cm) and an outside diameter of 3.135 inch (7.96 cm). FIG. 11C is an exploded view further illustrating relationships between components of the system 30.

The frame 46 is connected between an upper end cap 90 and a lower end cap 92. The end caps, which may be formed of polyvinyl chloride, each have a "T" cap configuration such that portions 94 of the caps protrude into the cylindrical frame 46. The upper cap serves as a support platform for mounting of a handle, connectors, an indicator light and a vent cap. The portions 94 include recesses for placement of O-rings 96 therein which facilitate formation of a water tight seal between the end caps and the frame 46. The frame 46, the end caps 90 and 92 and the O-rings 96 constitute a closed body assembly that defines a cavity 100 for housing a series of interconnected circuit boards 102. The closed body assembly is held in place with a series of fasteners 106. Opposing ends of each fastener 106 are threaded for engagement into a threaded bore 110 on the lower end cap 92 and a threaded extender 112 positioned on the upper cap 90. The fasteners 106 extend through the upper end cap 90 and thread into bores in lower ends of the extenders 112. Upper ends of the extenders 112 are threaded and pass through bore holes in a handle 116 for fastening with a mating nut 118. The handle 116 is secured to both the upper and lower end caps 90 and 92.

A feature of the system is provision of a series of apertures 120 along one or both end caps. The apertures are sealed with a flexible and highly elastic membrane which may comprise the same composition as the hermetic sealant 88. Although the apertures are sealed, the membrane can undergo substantial elastic deformation in response to slight fluctuations in pressure within the cavity. This permits equalization of pressure imbalances as noted below.

As the piezo polymer within the coaxial cable responds to excitations induced by seismic-acoustic waves, it is desirable that the piezo material freely undergo displacement in all directions, i.e., in the $d_{3h}$ mode. Such slight movement of the cable can result in transfer of a compressive force against the frame 46. To the extent the force can cause a pressure build-up within the closed cavity 100, the surface 62 of the frame will exhibit a stiffness which counters the compressive force imposed by the cable. As pressure build-up occurs within the cavity 100, the level of charge displacement in the cable will be reduced and, in turn, the amplitude of measured signals will also be reduced. To the extent that movement of the frame under such force might otherwise be impeded by such pressure build-up within the cavity 100, the portions of the membrane extending across the apertures 120 can undergo elastic deformation in response to slight pressure fluctuations within the cavity. This deformation reduces the magnitude of the pressure fluctuations which would otherwise occur, and the resulting resistive forces that can adversely constrain the responsiveness of the piezo material are thereby reduced. In summary, to the extent that movement of the cable would be constrained by compression of the frame of the closed body assembly, this stiffening is relaxed. Provision of the apertures 120 allows for displacement of the membrane material and adjustment of pressure imbalances. When the frame undergoes displacement, an effect which would dampen the vibration response of the cable is mitigated by the elastic deformations of the membrane about the apertures 120. Thus the apertures facilitate the function of providing a frame 46 which is a flexible mounting point for the sensing element 44.

The upper end cap 90 includes an antenna connector 124 which electrically couples an antenna 126 to an output signal generated by the communications module 40. A tether connector 136 positioned on the upper end cap 90 provides a port for power input and an Ethernet connection for data transfer and software configuration. A purge valve 130 in the upper end cap 90 allows for pressure equalization between the chamber 100 and atmosphere during periods when ambient pressure changes such as during air transport. An indicator lamp 134 on the end cap 90 confirms powered operation of the system 30.

Figure 12:
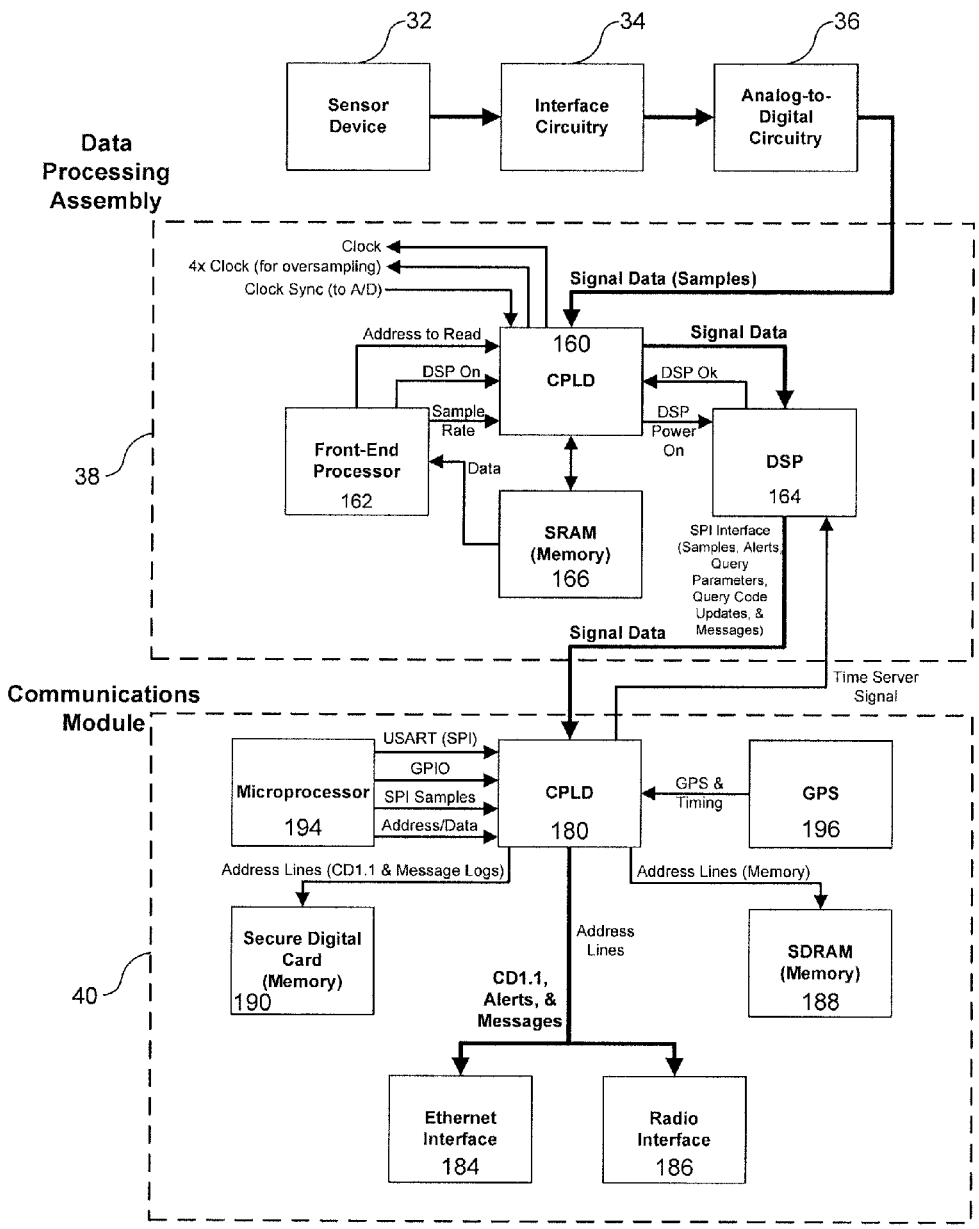
FIG. 12 is a simplified schematic diagram illustrating a general architecture of integrated electronics of the sensor system of FIGS. 11.
Figure 13:
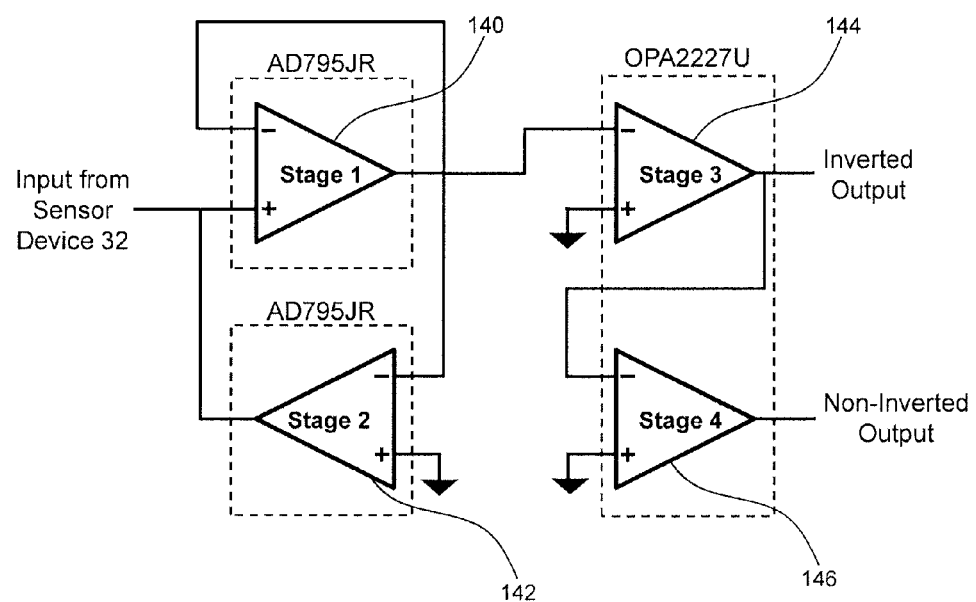
FIG. 13 is a simplified schematic diagram of interface circuitry shown in the architecture illustrated in FIG. 12.

FIG. 12 illustrates the general architecture and functionality of the integrated electronics. Seismic and acoustic data acquired by the sensor device 32 is received by the interface circuitry 34 for conditioning and amplification to provide an analog voltage signal to the A/D circuitry 36. See FIG. 13 which illustrates the interface circuitry 34 in a simplified form comprising four analog stages, contained within three physical operational amplifier integrated circuits (op amps).

The first stage 140 and the second stage 142, which receive the low voltage input from the sensor device, are low-noise, precision, Field Effect Transistor (FET) op amps. The third stage 144 and the fourth stage 146 reside in a single low-noise, high-precision op amp. The first stage 140 conditions the sensor device output with a high-gain amplifier and feeds the second stage 142 for control feedback and the third stage 144 for output generation. The first stage 1 also provides a control feedback connection with a pair of capacitors set to match the capacitance of the sensor device 44. Typically, piezo cables larger in length require larger capacitor values and piezo cables smaller in length require smaller capacitor values. The second stage 142 functions as a "servo amplifier" and ensures that the sensor element input on stage 1 is zeroed. This integrated feedback loop maintains signal integrity by actively controlling the signal input to the first stage 140.

The third stage 144 and the fourth stage 146 serve as output drivers with unity gain. The gain of these stages could be increased but doing such may require board level component changes. The third stage 144 provides an inverted signal output and the fourth stage 146 provides a non-inverted signal output. The non-inverted output is input to the A/D circuitry 36, and the inverted output is provided to a test point on the assembly.

The A/D circuitry 36 provides a 24-bit analog to digital signal conversion with anti-aliasing and four-times (4×) oversampling. The Data Processing Assembly 38 processes and analyzes signal data received from the A/D circuitry 36. The results of the analysis are provided to the Communications Module 40 for external notifications and data transmission.

The Data Processing Assembly 38 comprises a first Complex Programmable Logic Device (CPLD) 160, a front-end processor 162, a Digital Signal Processor (DSP) 164 and a dual port Static Random Access Memory (SRAM) 166.

The CPLD 160 governs the interaction of the front-end processor 162 and the DSP and data transfers between SRAM 166 and the processors. The CPLD also transmits clock signals originating on the DSP 164 to the A/D circuitry 36 and components on of the Assembly 38. The A/D sampling rate is defined by the front-end processor 162 and the CPLD 160 turns this into a clock signal which is fed at a normal and 4× (oversampling) rate to the A/D circuitry. The CPLD 160 also simulates hardware functions via embedded software using, for example, the VHDL programming language.

The A/D circuitry 36 provides a serial feed of data to the CPLD 160. The data stream from the circuitry 36 begins with a unique set of bits to signal an incoming sample, followed by 24 bits of sampled data, followed by a trailing set of bits to signal the completion of the data.

Data received by the CPLD 160 is stored in the SRAM using a circular buffer. and is accessible to both the front-end processor 162 and the DSP 164 via the CPLD 160. This memory area can retain up to 50 seconds of historical data to assist in the signal analysis process as needed. The CPLD 160 communicates with the DSP via a Serial Port interface.

The Front End Processor provides basic monitoring of signals while the DSP 164 is idle to minimize power consumption. The DSP 164 performs advanced analysis, detection and classification of signals. The Front End Processor 162 runs Finite Impulse Response (FIR) filters for sample analysis. After applying the filters, the front-end processor performs a gross-level pre-analysis on all samples received to determine whether a signal of potential interest is present, in which case the DSP goes into a processing mode. This methodology minimizes the DSP's "on-time" and reduces current usage to extend the battery life of the sensor.

When a signal is detected as data of potential interest, the front-end processor 162 directs the CPLD 160 to activate the DSP 164 and the CPLD 160 issues signals that turn on power to the DSP. In response, the DSP returns a signal to the CPLD indicating it is ready. The front-end processor 162 provides the memory address (pointer) to be read to the CPLD 160 and then the samples are fed to the DSP 164 for analysis. When the DSP 164 finishes processing the samples, it signals the CPLD to remove the front-end processor 162 from an idle mode and resume processing of information. The front-end processor 162 re-starts at a historical memory location (approximately five seconds in the past) to ensure that no samples are missed—ensuring continuous operation. Once the front-end processor 162 re-starts data analysis, it requests the CPLD 160 to deactivate the DSP in order to conserve power. An exemplary form of the DSP 164 suitable for running signal analysis algorithms for classifications and Detections 20 is a fixed point, dual core, 500 MHz, 32-bit processor. The DSP consists of two processors (Core A and Core B), which operate independently but have access to certain common memory resources.

When powered up by the CPLD 160 the DSP receives historical information starting at the identified memory pointer. Initially the rate of data transfer is very fast, using the maximum SPORT interface speed, but once the DSP completes processing of the historical data and begins processing signal data on a real time basis, the transfer rate is reduced to 2,000 samples per second. The transfer rate may be increased to 10,000 samples per second. The DSP uses the classification algorithms to detect and classify signals of interest. Upon identification of a classified SOI meeting confidence level criteria, the DSP signals the communication module 40 for external notification of a Detection 20.

Each core has assigned responsibilities, which are summarized herein. L1 cache memory is provided for each core. The total memory for L1 is 100 k of which 32 k is allocated for instruction space, 4 k for short term (scratch) use, and 64 k for data. L2 memory is dual-ported and accessible to both cores, providing space for samples and logging information. A mutual exclusion lock is implemented in the hardware to facilitate core access to L2 memory. L3 memory is external to the DSP and resides on a separate SRAM chip on the processing board.

Core A of the DSP 164 initializes the operating environment for the DSP embedded software structure, handles handshaking with embedded software running on the front-end processor 162 and embedded software running on Core B of the DSP, as well as operational management of DSP Core B, communication to the Communications Module 40 and messaging relating to alerts and warnings.

Core A of the DSP 164 receives frames of data and loads them into L2 memory, using a circular queuing method. The queue may be configured to support 10 seconds of data. Core B retrieves the frames of data and performs the requisite analyses, detection, classification and Determinations 20 using the developed algorithms. Upon completion, Core B indicates whether a SOI has been identified in accord with a predetermined level of confidence and transfers this and associated information to Core A via a logging mechanism. If a SOI has been identified which meets confidence level criteria, Core A facilitates the information transmission of the Determination 20 via the Communications Module. After the processing is completed, the DSP requests deactivation to revert to a power savings mode.

Core B of the DSP 164 initializes support structures, reads signal samples, and runs the classification algorithms for the specified classification types, generating warnings and alerts as necessary.

The Communications Module 40 can receive the sampled data stream, alerts and warnings generated by the DSP 164 and other messages specific to the operation of the Data Processing Assembly 38. All data flows from the DSP 164 of the Assembly 38 to a second Complex Programmable Logic Device 180 which controls flow of information to local memory and for transmittal via, for example, an Ethernet Interface 184 or a Radio Interface 186. The Module 40 includes program and data memory 188 supporting functions of microprocessor 194 and storage, shown in the form of a secure memory card 190, for storing signal data. Signal data may be uploaded via an interface 184 or 186 for transfer to a base station for further analyses or use in conjunction with training of classifier algorithms. The microprocessor 194 provides control functions for transmission through the Ethernet Interface and also applies algorithms to compress signal data prior to transmission through the interfaces 184 or 188. In addition, the microprocessor manages radio transmission through the interface 186 to minimize power consumption, manages Ethernet communications and provides a web-enabled interface for configuration parameter control and adjustment. A Global Positioning System (GPS) receiver 196 provides timing data which is sent to the Data Processing Assembly 38 through the CPLD 180. The timing signal received from the GPS controls the clock signals used by the Front End Processor 162 and the DSP 164 and is used to assign time information to frames of signal data.

Figure 14:
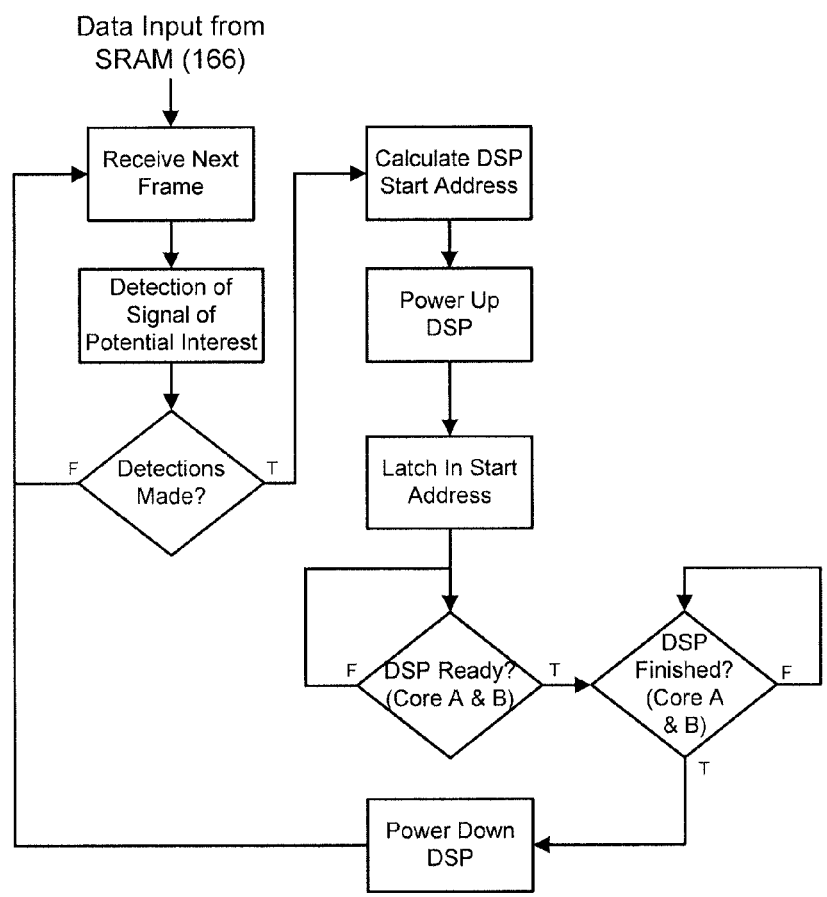
FIG. 14 is a flow chart illustrating a sequence by which signals of potential interest are identified.

The flow chart of FIG. 14 illustrates the main process loop by which signals of potential interest are identified, after which time single cycle and multi-cycle processes are applied to determine whether signals can be classified as SOI's. There is a continual flow of signal data into the CPLD 160 which is cyclically stored in SRAM 166. The Front End Processor 162 defines the data length of frames and acquires signal data from the SRAM 166 and then executes an algorithm for Detection of Signals of Potential Interest. When a Detection is made the Processor 162 performs tasks for hand-off of processing to the DSP 164, beginning with identification of memory address information in order for the DSP to begin reading signal data from SRAM 166. The Processor 162 also sends a signal through the CPLD 160 to turn on the DSP 164. While the DSP is powering up, the address at which signal data is to be read from memory is sent to the CPLD 160. Once the DSP 164 is ready the Processor 162 goes into an idle state while the DSP performs analyses relating to single cycle classification, multi-cycle classification and Determinations 20. Once the DSP is finished the Front End Processor resumes Detection of Signals of Potential Interest.

Figure 15:
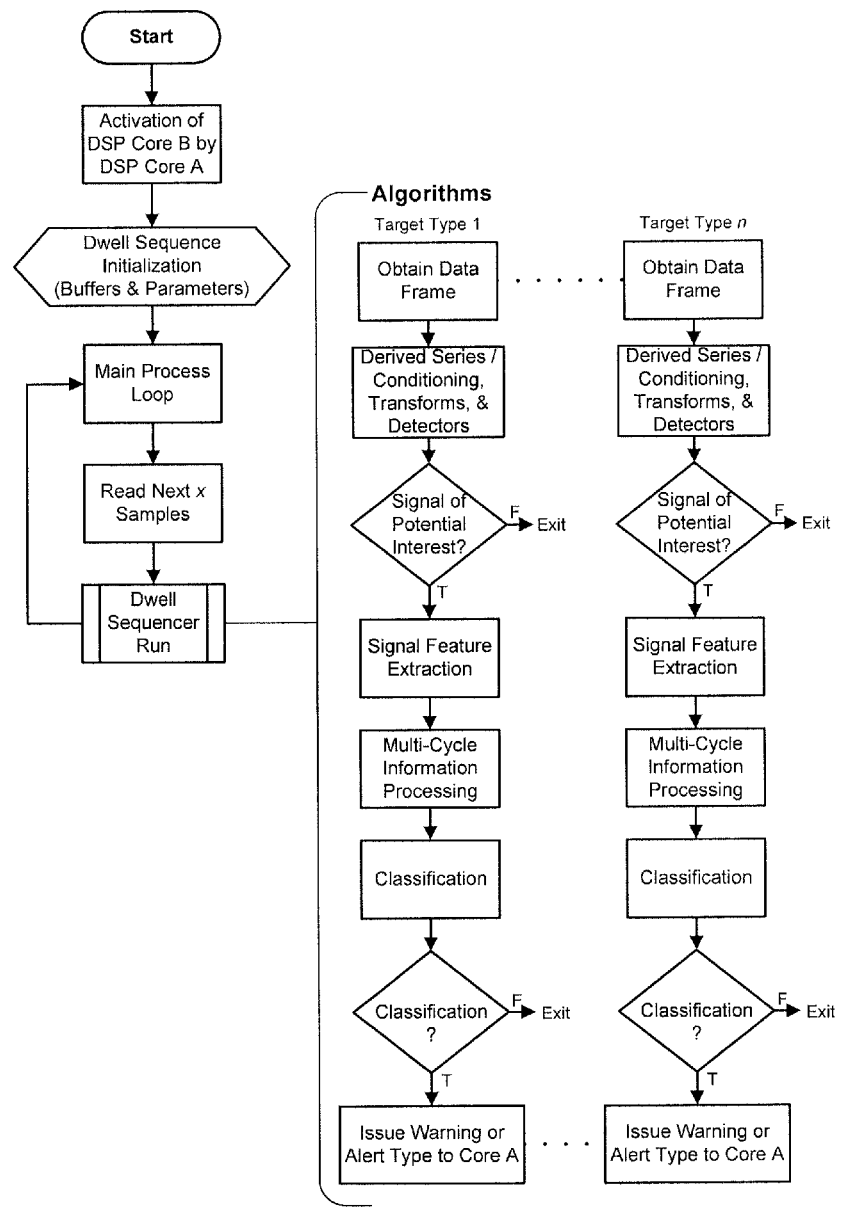
FIG. 15 is a flow chart illustrating a sequence by which analyses leading to classifications and determinations of Signals of Interest are performed.

FIG. 15 provides a general sequence of steps by which the DSP 164 performs analyses relating to classification and Determinations 20. Once the CPLD turns on the DSP, Core A of the DSP initializes DSP Core B and related storage. DSP core A sends a signal to the Front End Processor to confirm that the DSP is operational and enables Core B for algorithm processing, starting with a main loop. Signal data is received from the SRAM 166 through the CPLD 160 and the samples are buffered for input to the Algorithms. The Main Loop also runs the Dwell Sequencer which pipes data through each of the Algorithm sets to identify SOI's corresponding to any of Target Type 1 through Target Type n. Algorithms are created specific to target type, but all Algorithms follow a basic series of operations as shown in FIG. 15. It is to be understood that the descriptions of the Algorithms are conceptual and functional and do not necessarily depict the sequence in which individual steps are executed.

Each Algorithm begins with obtaining individual frames of data, next conditioning the data, computing transforms and applying detection criteria. If a Signal of Potential Interest is not detected the DSP hands Signal Detection back to the Front End Processor 162 and is powered down per FIG. 14. If a Signal of Potential Interest is detected the DSP proceeds with Signal Feature Extraction wherein the characteristic features of the detected signal are consolidated in a single cycle detection object and a multi-cycle detection object as more fully described hereafter. As the Algorithm processes through frames of signal data the accumulated information is buffered. When sufficient data is acquired there is either a classification or a determination that there is not a SOI. If there is a classification a Warning or an Alert is sent to Core A for issuance. Although depicted as separate flows for each Target, the execution of steps of different Algorithms may be interleaved. For example, Core B may perform conditioning, obtain transforms and perform detections for multiple Algorithms before proceeding to Feature Extraction and Classification.

Figure 16:
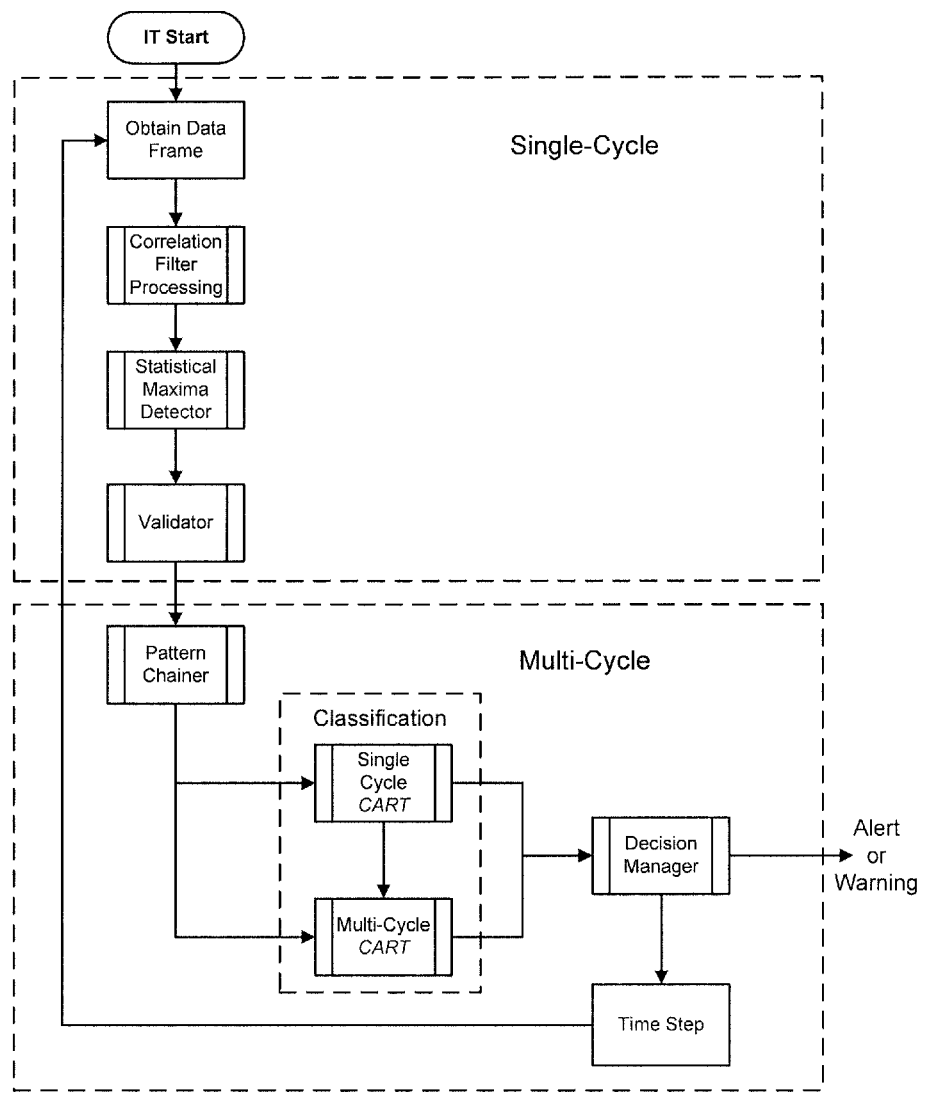
FIG. 16 is a flow chart illustrating an exemplary classification process.

FIG. 16 is exemplary of one implementation of a classification process for an Impulsive Transient (IT) signal. Individual frames of data are read and the algorithm applies one or more correlation filters and a statistical maxima filter which examines results of the correlation filter for maxima. A Validator examines derived series representing noise, correlation minima and other statistical quantities to determine whether detections are valid and builds single cycle detection objects. Single cycle detection objects are then made available for multi-cycle processing. The initial step is the formation of multi-cycle detection objects with a Pattern Chaining Algorithm which uses the information contained in the single cycle detection objects and expert logic to associate suitable detection objects and extract additional information. The multi-cycle detection objects are then examined by the IT classification algorithms (Single Cycle Classification and Regression Tree (CART), Multi-Cycle Classification and Regression Tree (CART) and if a classification is made the result goes to the Decision Manager to determine whether to issue a Warning (based on single cycle assessment) or an Alert (based on multi-cycle assessment).

Figure 17:
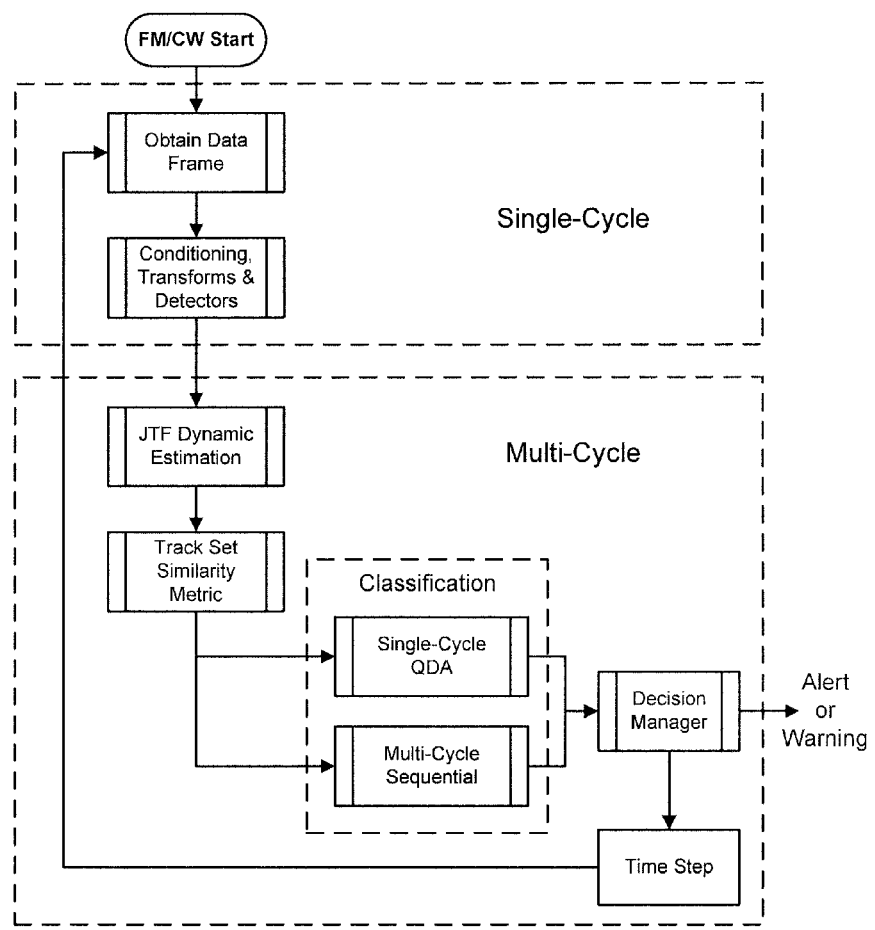
FIG. 17 is a flow chart illustrating another exemplary classification process.

FIG. 17 is exemplary of one implementation of a classification process for an FM/CW signal. The algorithm performs conditioning, transformations and detections to individual frames of data. Detection is based on statistical quantities derived from current spectral power levels in defined frequency channels relative to previous estimates of noise levels. Single cycle detection objects are created from this information and made available for multi-cycle processing. Multi-cycle processing is initiated using a state-based estimation routine in the Joint Time Frequency (JTF) Domain, incorporating time-frequency track information and dynamic models of how that information evolves in time. The Track Set Similarity Metric is a determination based on associations among the total set of tracks and based on characteristics of specific sources. Each of the tracks is a multi-cycle detection object used in the classification stage which comprises a single cycle Quadratic Discrimination Analysis (QDA) and Multi-cycle Sequential Analysis. When a signal is classified as an FM/CW SOI the Decision Manager issues a Warning or an Alert based on confidence level thresholds set in the configuration for the Decision Manager.

The goal of many passive monitoring systems for situational awareness or local area monitoring is to detect and classify signals generated by a source or activity that requires a response. These signals are considered rare events embedded in a variable background of noise and finite duration signals that are not of interest. The monitoring system may be comprised of a single sensor device or a group of sensor devices that output a signal that may be converted into a continuously sampled digital time-series. The time series is further processed with the objectives of identifying and separating the Signals of Interest from the bulk of the noise and uninteresting signals present in the data stream and then classifying the signals.

In the system 30 a sensor device 32 measures the ambient strain field for seismic or acoustic energy in the form of a traveling elastic strain field generated by a specific source or activity. The measurement, processed as a time varying voltage, which is proportional to the strain rate, is sampled and converted into a digital time series. The Signal of Interest may be one of several broad classes of signals. Those classes may include very short time duration transient phenomena referred to as Impulsive Transient (IT) signals, narrow-band continuous phenomena of longer duration whose character is best expressed as a frequency domain phenomena and referred to as Frequency Modulated or Continuous Waveform (FMCW) signals, or Emergent Signals (ES), mixtures of IT and FMCW phenomena that may emerge relatively slowly from the noise background compared to an IT signal. The continuous digital time series is processed in the form of data frames of defined time duration and additional series of data are derived. The additional series are formulated to highlight particular characteristics that then are used alone or in combination as characteristic feature sets. One of those feature sets is generally a quantity used as a detection statistic for a particular SOI. The calculated signal to noise ratio is an example of this where the expected noise, based on time averaged noise data, is used in the ratio denominator. Generally, the additional series are used to determine presence in the data of characteristics associated with classes to which Signals of Interest are associated.

The data frames may be sequential with no overlap of time signal data or they may be overlapping time frames. Frames comprising 4096 or 2048 signal values may, for example, be formed in sequential steps with an overlap of 1024 or 512 or 256 values. Thus the overlap may vary depending upon processing required to identify distinguishing source characteristics of a particular signal type in the given time series. Once a signal of potential interest is detected, the combined set of continuous raw and derived series data is discretized and consolidated into a detection object containing the characteristics of the signal which resulted in the detection. At this point the continuous data stream has been reduced to a set of information contained within the detection object. Single cycle detection objects may exist across adjacent frames of data. The process resulting in a formation of a single-cycle detection object is termed "single-cycle processing" and involves operating the detection algorithm on a continuous data stream, but the analysis may proceed in the time domain, the frequency domain, or other vector space projections of the raw time-series.

For example, it has been found that IT signals are best distinguished by applying detection algorithms in the time-domain. Time domain processing may be performed on data frames that do not-overlap in time at all, or on buffers that do overlap. In the context of classifying IT signals, the term "single-cycle processing" (corresponding to the afore-described first assessment), refers to the action of a set of algorithms operating on an individual time domain data packet (e.g., one frame of data) processed by the system to generate several derived series. Single-cycle processing generates one or more single-cycle detection objects comprising a consolidated set of information which describes specific features of the current signal observed by the detection algorithms.

When applying the system 30 to classify an IT signal, time domain processing may include (i) use of a derived series to compare measured power of the signal with the time averaged power of ambient noise (where values of noise power are estimates based on earlier data sampling, (ii) determination of the dominant frequency band of the signal, or (iii) analysis of particular time-phase patterns of the signal. For example, if the estimated power of the signal is used as the detection statistic for a particular signal of interest (SOI), when that estimated power rises above a specified threshold, a detection object would be opened, and remain open until a criteria of detection quality, which may be the estimated power or a feature of a different derived series, drops below some critical value, or a duration time is exceeded, at which time the detection object becomes "closed."

In contrast to IT signals, FMCW signals are best distinguished by applying detection algorithms within the frequency domain. The system 30 applies frequency domain processing on overlapping data frames with a duration dictated by the required frequency resolution and an overlap dictated by the required time resolution. In the context of classifying FMCW signals, the term "single-cycle processing" refers to the action of a set of algorithms operating on an individual time domain data packet (e.g., one frame of data) which has been transformed into the frequency domain. In the frequency domain, additional information is derived which may include feature spaces that are normalized and reduced in dimensionality or additional transforms of the frequency domain data.

When applying the system 30 to classify FMCW signals, processing includes use of the derived series to compare the spectral power of the signal with the time averaged power of the ambient noise and determine the spectral content of the power structure which the signal exhibits. The result of applying "single-cycle processes" to an FMCW signal is a set of single cycle FMCW detection objects capturing narrow band phenomena as well as the consolidated set of information which describes the frequency content of the current time-series within the processed frame of data.

With regard to SOI's generally, the system 30 makes single cycle detection objects available to an array of information processing modules resident in the Data Processing Assembly 38 for classifying signals of potential interest. Those modules may include single-cycle classification algorithms operating on individual detection objects, multi-cycle processing algorithms operating on the extended set of single-cycle detection objects, and multi-cycle classification algorithms operating on the combined results derived from prior application of information processing algorithms. The term "multi-cycle processing" refers to the operation of a set of algorithms on the set of single-cycle results. Multi-cycle processing creates one or more multi-cycle detection objects and additional derived information. Multi-cycle processing may include chaining or tracking algorithms, sequential analysis algorithms, expert logic, and source specific algorithms designed to derive additional multi-cycle features. The multi-cycle algorithms existing in the processing chain prior to the classification algorithms generally derive additional information from groups of single-cycle detection objects alone or in combination with other multi-cycle information.

For classifying IT signals, the system 30 creates multi-cycle detection objects by associating observed time domain impulses which are thought to have originated from the same signal source or those which are positioned adjacent one another in the time series. The likelihood of there being an association between a signal of potential interest derived from a single cycle process, and any particular multi-cycle detection object may be quantified using metrics based upon the similarity in power of the single cycle detection objects, the similarity in waveform of the single cycle detection objects, the time distance between single cycle detections, or the expected time position of single-cycle detections.

Monitoring the single cycle detections for association with a multi-cycle detection object may be a continuous process until the multi-cycle detection object is closed. The consistency of determinations that the initial hypothesis is true may be measured over the lifetime of the multi-cycle detection object and metrics defining the quality of the association may be derived. An association between a single cycle detection and a multi-cycle detection object is considered valid when this metric of quality exceeds some value and can be considered "closed" when a criteria of quality drops below some value or a duration time is exceeded. The time evolution of such a multi-cycle detection object may be estimated and predicted for following time segments using a state based approach, such as a Kalman filter, in which case the multi-cycle detection object may form a chain or a cluster.

The association of a signal of potential interest derived from a single cycle process with a multi-cycle detection object renders IT classification a fundamentally event-driven process. When a detection object is adjacent the boundary of a data frame, that object is maintained in an "open" state, and may continue to assimilate information present in the next data frame if the potential signal of interest crosses the frame boundary into the next time-adjacent frame. Another perspective of IT processing is that the multi-cycle chain or cluster is fundamentally an event-driven process. However, the desire for computational and data-handling efficiency dictates that a cyclic processing be superimposed over any fundamental event-driven nature.

For the FMCW system, multi-cycle detection objects may be created through the association of frequency domain detections from single time frames (single-cycle FMCW detection objects) which are thought to have originated from a single source. The hypothesis of joint-time-frequency domain association may be based on a similarity in power of the frequency domain detection, expected frequency value, continuation of phase value, or similar frequency domain based features. For FMCW joint time-frequency association, it is assumed that a given source producing a frequency domain signature will have a frequency domain feature set that may modulate slowly with respect to the buffer rate. The time evolution of such a multi-cycle detection object may be estimated and predicted for the following time segment using a state based approach, such as a Kalman filter, in which case the multi-cycle detection object forms a joint-time-frequency (JTF) domain track.

The association between single-cycle FMCW detection objects and multi-cycle FMCW detection objects may be monitored over the lifetime of the JTF domain track. The consistency with which the initial hypothesis is found to be true (smooth frequency transition and smooth power transition) may be used as a quality metric. The track is considered valid when this metric exceeds some value and can be considered "closed" when the quality drops below some value.

The purpose of the classification algorithms is to generate a statistically robust decision as to the type of source generating the SOI. The classifier may generate an instantaneous Determination 20 based on whatever information is available at a point in time (single cycle-classification), or it may generate a decision based on current signal information in combination with information derived from multiple prior time cycles. Initially the system 30 issues single-cycle-classification decisions as "Warning" determinations, reserving the final "Alert" determinations for decisions based on processing with multi-cycle classification algorithms. Using this paradigm, multiple types of sources may coexist in the data stream and be successfully separated and classified so long as the single cycle and multiple cycle feature sets derived therein are separable. Multi-cycle classification includes the analysis of the chain or cluster (IT processing), or track (FMCW processing) using statistical algorithms that may include linear discrimination analysis (LDA), quadratic discrimination analysis (QDA), logistic regression classification (LRC), and classification and regression trees (CART) among others. The multi-cycle classification algorithms culminate in a classification decision based on the consolidated multi-cycle feature set.

Figure 18:
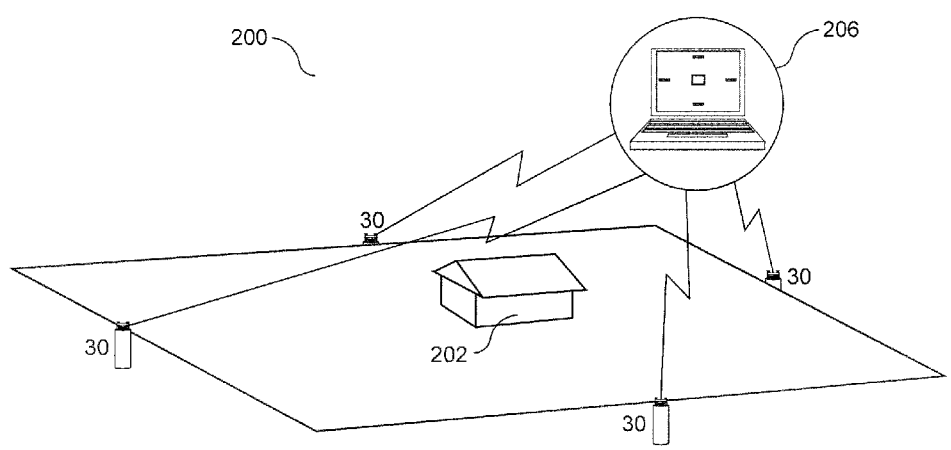
FIG. 18 illustrates a system for monitoring an area according to the invention.

One application of the sensor system 30 is provision of a single sensor device which operates with the afore-described analysis and reporting capabilities to communicate a variety of information to a remote receiver 42. In other applications, a group of independent sensors may form a network wherein each reports to a common monitoring station, which may be a portable display device, such as a laptop computer, personal digital assistant, or a palmtop-sized personal computing device. The individual sensor systems may operate independently of one another and are typically portable, though they may be permanently installed. Both the architecture and function of the individual systems may be modified to suit specific applications. For example, the electronics need not be integrated with the sensor device, the electronics may provide different functions and the data sent through the communications module 40 may be varied. The system may be deployed to monitor a perimeter or length associated with valued assets, such as a war fighter forward operating base or equipment storage area, or a geopolitical border, and provide surveillance, such as monitoring for activities of interest along a line or in an area local to the individual sensors or network of sensors. FIG. 18 illustrates such a system 200 comprising multiple sensors systems 30 deployed around a valued asset 202. Each sensor is deployed in the same manner as a single sensor system 30, working independently of the others, communicating to a monitoring station 206 reports, Warnings and Alerts. Communication between each sensor system 30 and the monitoring station 206 may be direct, with or without an intervening transceiver, such as a repeater. However, communications may be through formation of an ad-hoc network where the sensors themselves act as intermediaries forwarding communication to the common monitoring station 206. The ad-hoc network, referred to as a mesh network, is a self-configuring network of communications nodes. That is, each sensor system 30 may be configured as a communications node within the network, forwarding messages from other sensors, while also acting as a sensor element and generating messages on its own.

In the system 200, information sent from each sensor system 30 is coded to identify the sending system 30. The common monitoring station 206, not necessarily located in a central part of the network, contains software that enables the decoding, attribution, and organization of the communicated messages. The common monitoring station 206 may also include a graphical interface or display, such that the information can be referenced to the sensor identity or displayed using a geographic information system layout, showing the position of the sending sensor on a map. The available source signatures for monitoring in the multiple sensor embodiment are the same as for a single sensor, and include the entire variety of aforementioned signature classes. In addition, reports of persistent activity over time are available, as are state-of-health messages, the assessment being made on the monitoring station using pertinent information analysis algorithms.

For the embodiment of FIG. 18, such multisensor systems 200 are typically provided in "kits", containing the individual sensors systems 30, batteries, embedded communications systems to link each sensor with the monitoring station, and the monitoring station 206. When deploying the sensors, a maximum area can be monitored by spacing the sensors at the limits of their sensitivity ranges for the source signatures of interest. To increase confidence in reported Alerts, the sensors can be placed closer together, overlapping their sensitivity ranges and providing multiple alerts for a given signature source. Raw measurement data are processed first by a multi-stage signal processor subsystem built directly inside the individual sensor systems. Further processing may be performed by the monitoring station to draw inferences regarding SOI's.

Using a multiple sensor devices 32 or multiple sensor systems 30 in a monitoring system adds the advantages of larger area coverage and, optionally, higher confidence in alert accuracy relative to the performance of single sensor systems. Additional advantages are gained by forming a multiple sensor system as a coordinated array of sensor devices and using coordinated array data processing methodologies. In such embodiments, some of the data processing electronic elements may be physically removed from each sensor system 30 and be contained in a "smart node" processing system. The individual sensor systems may be coupled to the Smart Node by cable having internal conductors that carry continuously digitized seismic data from each sensor to the Smart Node. The sensor systems may also transmit data to the Smart Node using a wireless communications link.

Figure 19:
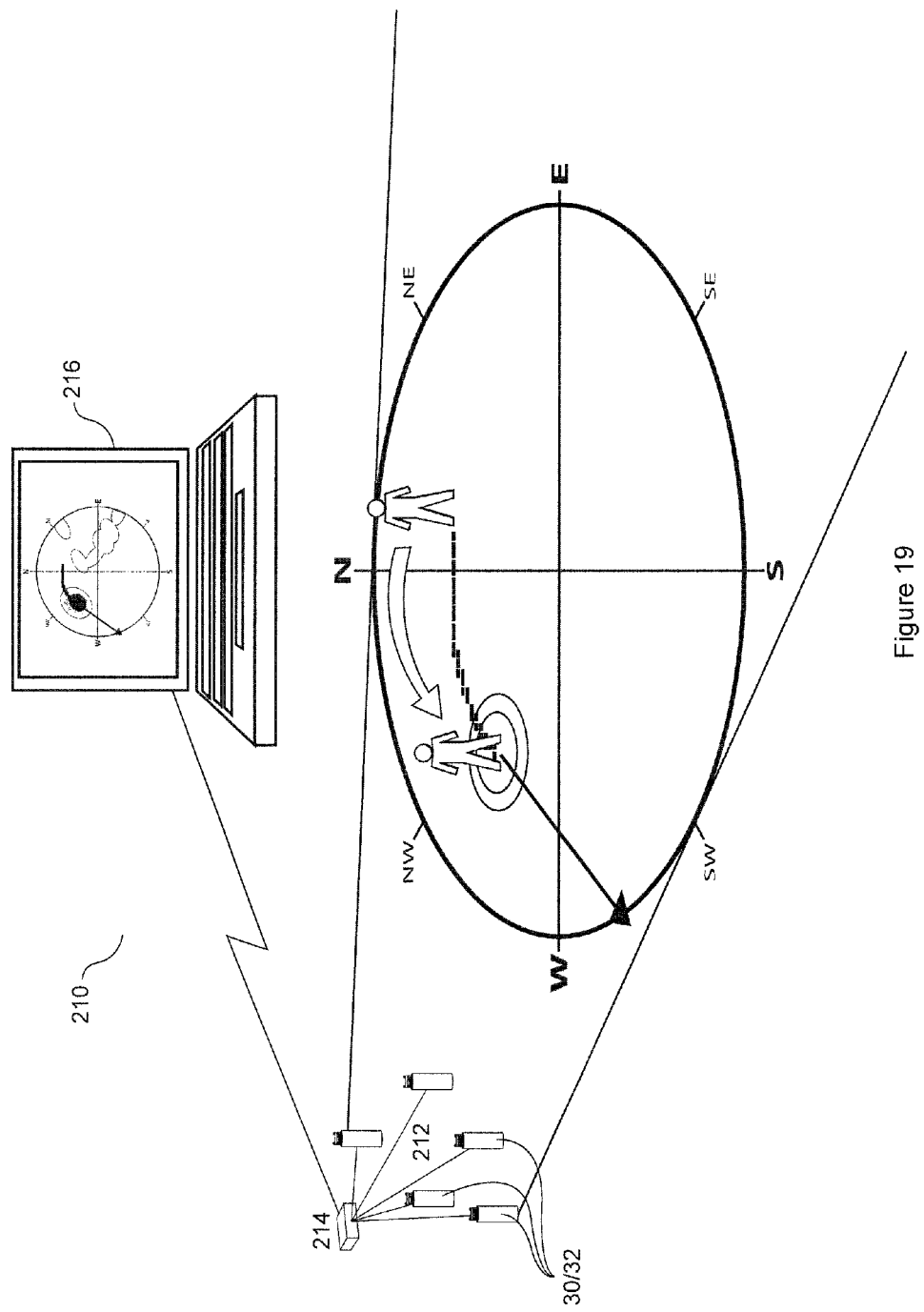
FIG. 19 illustrates a smart node processing system incorporating a sensor device and array processing according to the invention.

A functional illustration of such a smart node processing system 210, utilizing array processing, is shown in FIG. 19. Multiple sensor devices 32, or sensor systems having processing capability of the nature described for the sensor system 30, are deployed as an array 212. The sensors continually acquire seismic acoustic data and transmit the data to a smart node processing unit 214. In addition to receiving, organizing, and storing digital seismic data, supplying power and a master clock signal to the individual sensor systems (for a wired array arrangement), and monitoring the state of health of the individual sensors, the processing unit 214 combines and processes the entirety or subsets of the data received from the sensors populating the array 212 in order to extract actionable information. The processing unit transmits the information developed through processing the combined data either by wire or wirelessly to a typically remote monitoring station 216, which can be any computer-based system containing a transceiver and monitor/display capability. The remote monitoring station 216 contains all of the functionality of the multiple sensor network common monitoring station 206, and may contain additional functionality such as a visual representation of the site's response to its environment, a near real time visual display of the processed array information, a visual display of historical information from the array, and near real time and historical information from other independent sensors not within the array and other independent arrays.

Such geographical information displays appear similar to weather radar, where activity detection probabilities appear as color coded or color contoured regions superimposed over the geographical map of the monitored area. Such outputs from the combined information set may be fused with additional visual or other systems such as pan/tilt zoom cameras and closed circuit television for security personnel assessment. This approach provides extreme scalability from a single site to a large geographical area that may consist of multiple sites. The visual geographical fused information display can easily zoom in from large area coverage to specific sites of activity while providing complete situational awareness of the larger contextual monitored area.

The smart node processing system 210 performs complex and computationally intensive operations such as combined coherent processing of the array data. Coherent array processing provides advantages by performing signal processing in both time and space. This requires seismic-acoustic sensors that are synchronized to a common time base and deployed as arrays, with multiple arrays potentially surrounding an area of interest. The key enabling technologies for this capability are (1) high sensitivity, highly coherent seismic-acoustic sensors, and (2) Frequency-Wave Number (FK) beamforming. Three coherence factors must come together to make seismic-acoustic array processing possible: (1) coherence in time, (2) coherence in space, and (3) measurement coherence. Temporal and spatial coherence are achieved through Global Positioning System (GPS) technology and by laying out sensors in arrays with appropriate spacing.

"Measurement coherence" means that the sensors must respond identically to seismic energy, in both amplitude and phase. Most seismic sensors use systems of springs and masses in conjunction with damping elements to convert seismic energy to electrical voltage signals, and as such these sensors are difficult and expensive to manufacture with sufficient coherency for array processing, especially over a broad frequency band that includes frequencies in the audible range acoustic energy. The disclosed sensor, due to its design and sensing material properties, provides extreme coherence from sensor to sensor.

The unusually uniform phase and frequency response between sensors generates an unusually high array gain compared to typical seismic sensors when coherent processing methods are employed. Coherent processing, often called beamforming but not limited to creating beamed data, is commonly used with active and passive RADAR and SONAR systems in order to "spotlight" particular geographic sectors through the amplification of coherent signals and attenuation of incoherent noise. Seismic array processing uses the same well-established principles to enhance detection in a specific geographic area by defining a beam using the appropriate frequency and wave number parameters.

In geophysical investigations coherent processing methods are formulated into wave number manipulations within the frequency domain to form beamed data (FK beams, after the generally accepted mathematical symbols for frequency and wavenumber). The general FK algorithm searches for global maxima of combined array power as a function of both frequency and the wave number vector, where frequency describes periodicities in time (cycles per second) and wave number describes periodicities in space (cycles per meter), determined for overlapping time frames. The result is a beam that pinpoints the direction of seismic energy even when the energy propagation is not simple. Coherent processing is performed by the Smart Node software, either in embedded or host-based electronics platforms depending upon the requirements of the situation.

Extending the FK beamforming methodology, energy maxima exceeding a preset threshold, registered as single-cycle detection objects, may be automatically tracked using a Kalman filter or similar tracking algorithm operating in the FK slowness space. For persistent FK domain tracks surpassing a time-cycle length threshold, a beam recipe may be formulated, consisting of a set of delays and weights, one for each sensor element in the array, allowing either a traditional delay-and-sum fixed beam to be formed on the target, or allowing for a continually steered beam to be formed as the track is updated, and existing as long as the FK track persists. As the FK track is updated, the Kalman algorithm predicts the next location of the source, a new beam recipe is formed, and the steered beam adjusted and computed.

The resulting time series waveform becomes a "dynamic seismogram" that follows the source of energy wherever it moves. If the energy is stationary, the steered beam remains fixed, but ready to move if the source moves. Steered beams appear when a source of energy appears, move to follow the source as the source moves and disappear when the source of energy disappears The time series waveforms generated from the fixed or steered beam may then be forwarded to the existing suite of signal and information processing algorithms for further processing and alert generation.

Although example embodiments according to the invention have been described, numerous other devices, systems and methods will be apparent, and it will be understood by those skilled in the art that various changes may be made and equivalents may be substituted for elements thereof without departing from the scope of the invention. Accordingly, the scope of the invention is only limited by the claims which follow.

The invention claimed is:

1. A sensing system responsive to acoustic or seismic signals, comprising:
a frame; and
a piezo-electric sensor element, responsive to a wavefield of seismic or acoustic energy, positioned about the frame, wherein coupling between the sensor element and the frame is so limited as to render direct coupling of the sensor element with the wavefield the predominant means for stimulating the sensor element with seismic energy.

2. The system of claim 1 wherein the element is a multilayer material comprising a polymer.

3. The system of claim 1 wherein the element is in the form of a coaxial cable comprising a material having piezo-electric properties positioned between conductors to generate a charge differential measurable as a voltage between the conductors.

4. The system of claim 1 wherein the frame is in the shape of a tubular body and the element is a cable comprising spaced-apart conductors wrapped around the frame in a spiral configuration to form a single row of the cable with the cable arranged in a non-overlapping configuration.

5. The system of claim 1 wherein the sensor element is in a coil configuration.

6. The system of claim 1 wherein the sensor element is responsive to strain in multiple modes.

7. The system of claim 6 wherein the sensor element is responsive to strain in multiple modes, including $d_{31}$, $d_{32}$ and $d_{33}$.

8. The system of claim 1 wherein the frame and element form a first sensing device, the system further comprising:
one or more additional sensing devices each comprising a frame and an element, responsive to the wavefield, positioned about the frame; and
a monitoring device coupled to receive information from each of the sensing devices.

9. The system of claim 8 configured to generate classification information based on data acquired by one or more of the sensing devices.

10. The system of claim 9 wherein:
the sensing devices are configured as a coordinated array; and
the monitoring device performs coherent processing of data acquired by the array of devices.

11. A sensing system responsive to acoustic or seismic signals, comprising:
a frame; and
a cable element, responsive to a wavefield of seismic or acoustic energy, extending about the frame, wherein coupling between the cable element and the frame is so limited as to render direct coupling of the sensor element with the wavefield the predominant means for stimulating the sensor element with acoustic or seismic energy.

12. The system of claim 11 wherein the element is a multilayer material comprising a polymer.

13. The system of claim 11 wherein the element is in the form of a coaxial cable comprising a material having piezoelectric properties positioned between conductors to generate a charge differential measurable as a voltage between the conductors.

14. The system of claim 11 wherein the frame is in the shape of a tubular body and the element is a cable comprising spaced-apart conductors wrapped around the frame in a spiral configuration to form a single row of the cable with the cable arranged in a non-overlapping configuration.

15. The system of claim 11 wherein the sensor element is in a coil configuration.

16. The system of claim 11 wherein the sensor element is responsive to strain in multiple modes.

17. The system of claim 16 wherein the sensor element is responsive to strain in multiple modes, including $d_{31}$, $d_{32}$ and $d_{33}$.

18. The system of claim 11 wherein the frame and element form a first sensing device, the system further comprising:
one or more additional sensing devices each comprising a frame and an element, responsive to the wavefield, positioned about the frame; and
a monitoring device coupled to receive information from each of the sensing devices.

19. The system of claim 18 configured to generate classification information based on data acquired by one or more of the sensing devices.

20. The system of claim 19 wherein:
the sensing devices are configured as a coordinated array; and
the monitoring device performs coherent processing of data acquired by the array of devices.

* * * * *

UNITED STATES PATENT AND TRADEMARK OFFICE
CERTIFICATE OF CORRECTION

PATENT NO.         : 9,057,796 B2
APPLICATION NO.    : 13/423589
DATED              : June 16, 2015
INVENTOR(S)        : Paul Armin Nyffenegger, Mark Andrew Tinker and Arthur Owen Endress It is certified that error appears in the above-identified patent and that said Letters Patent is hereby corrected as shown below:

Title page, Item 54 and in the Specification, column 1 - Please delete "SYSTEMS AND METHODS FOR ACQUIRING AND CHARACTERIZING TIME VARYING SIGNALS OF INTEREST" - and Insert - --SENSING SYSTEM RESPONSIVE TO ACOUSTIC OR SEISMIC SIGNALS--

Signed and Sealed this
Twentieth Day of October, 2015

Michelle K. Lee
*Director of the United States Patent and Trademark Office*